United States Patent [19]
Alper

[11] Patent Number: 5,961,823
[45] Date of Patent: *Oct. 5, 1999

[54] OIL COAGULANT PRODUCTS AND METHODS OF USE THEREFOR

[75] Inventor: Haluk Alper, Flowery Branch, Ga.

[73] Assignee: Mansfield & Alper, Inc., Gainesville, Ga.

[ * ] Notice: This patent is subject to a terminal disclaimer.

[21] Appl. No.: 08/856,263

[22] Filed: May 14, 1997

Related U.S. Application Data

[63] Continuation-in-part of application No. 08/764,439, Dec. 12, 1996, Pat. No. 5,837,146, which is a continuation-in-part of application No. 08/572,986, Dec. 15, 1995, Pat. No. 5,746,925, which is a continuation-in-part of application No. 08/506,968, Jul. 28, 1995, Pat. No. 5,698,139, which is a division of application No. 08/074,114, Jun. 8, 1993, Pat. No. 5,437,793.

[51] Int. Cl.$^6$ .......................... B01D 17/022; B01J 13/00; C02F 1/52
[52] U.S. Cl. ..................... 210/198.1; 210/242.1; 210/242.4; 210/924; 210/925; 516/108
[58] Field of Search ................ 252/315.4; 210/693, 210/705, 733, 923, 924, 198.1, 242.4; 516/108

[56] References Cited

U.S. PATENT DOCUMENTS

| | | | |
|---|---|---|---|
| 3,067,154 | 12/1962 | Sterling et al. | 524/313 |
| 3,679,058 | 7/1972 | Smith | 210/924 X |
| 3,686,870 | 8/1972 | Blomberg | 210/924 X |
| 3,755,189 | 8/1973 | Gilchrist et al. | 252/315.4 |
| 3,977,967 | 8/1976 | Trulson et al. | 210/638 |
| 3,998,060 | 12/1976 | Preus | 210/923 X |
| 5,066,405 | 11/1991 | Liston et al. | 210/923 X |
| 5,087,152 | 2/1992 | Whidden | 210/923 X |
| 5,200,083 | 4/1993 | Kaylor | 210/923 X |
| 5,364,680 | 11/1994 | Cotton | 210/693 X |
| 5,423,985 | 6/1995 | Addeo et al. | 210/693 X |
| 5,437,793 | 8/1995 | Alper | 210/728 |
| 5,698,139 | 12/1997 | Alper | 252/315.4 X |
| 5,746,925 | 5/1998 | Alper | 252/315.4 X |

*Primary Examiner*—Richard D. Lovering
*Attorney, Agent, or Firm*—Klauber & Jackson

[57] ABSTRACT

Oil coagulant compositions, and methods of using such compositions to coagulate the oil that has been spilled on water are prepared from a thermal reaction utilizing an oil component selected from the group consisting of glycerides, fatty acids, alkenes and alkynes, and a copolymer component. Representative polymers include, for example, isobutyl methacrylate polymers, and representative oil components include, for example, glycerides such as those derived from a drying oil such as linseed oil. The composition of the present invention floats on the water surface and coagulates oil independent of both agitation and temperature, and can be used in both salt and fresh water. After the coagulant has coagulated the spilled oil, the floating coagulated oil can be readily removed from the water by mechanical means such that at least 99.9% of the oil is removed from the water and only a faint trace of oil remains in the water. An alternate way of using the composition is to incorporate it into a porous substrate, which substrate is then applied to the spilled oil. Preferably, the porous substrate is a floatable material, enabling the product to keep afloat Group 5 oils or asphalt. Various devices for confining, containing or controlling a contaminant in a liquid, with or without coagulant impregnated thereon or therein, are presented.

37 Claims, 16 Drawing Sheets

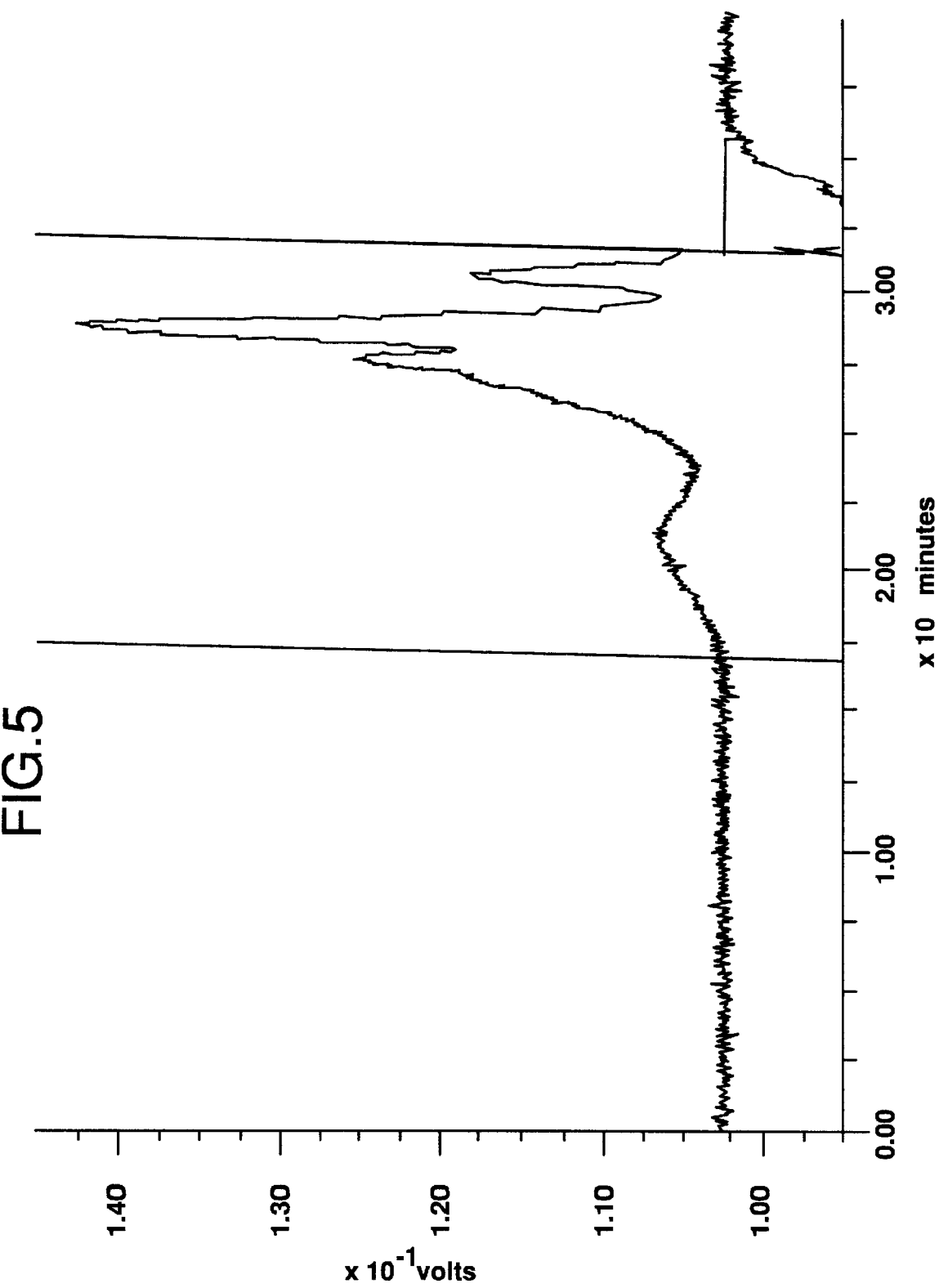

FIG. 9   FIG. 10   FIG. 11
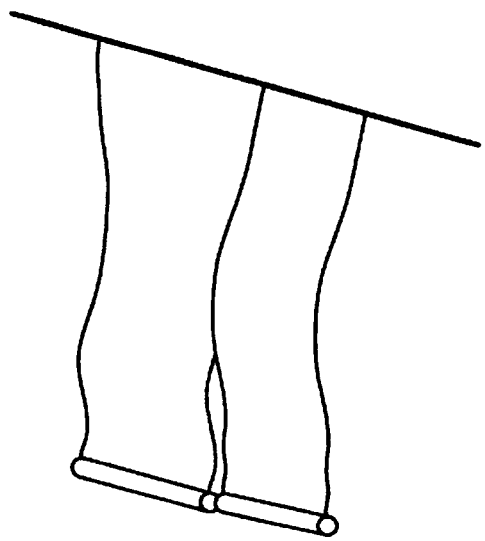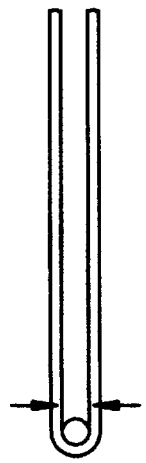
FIG. 12
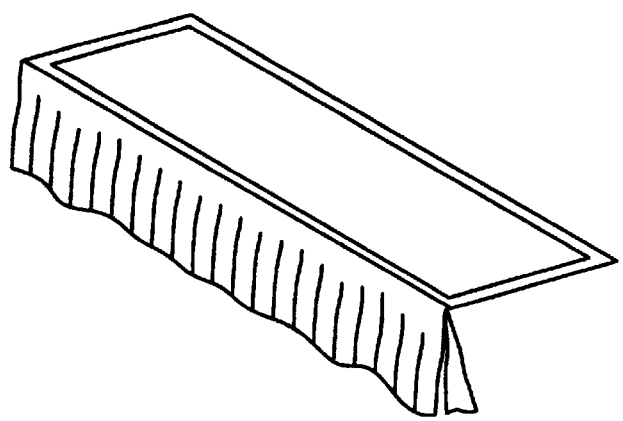
FIG. 13
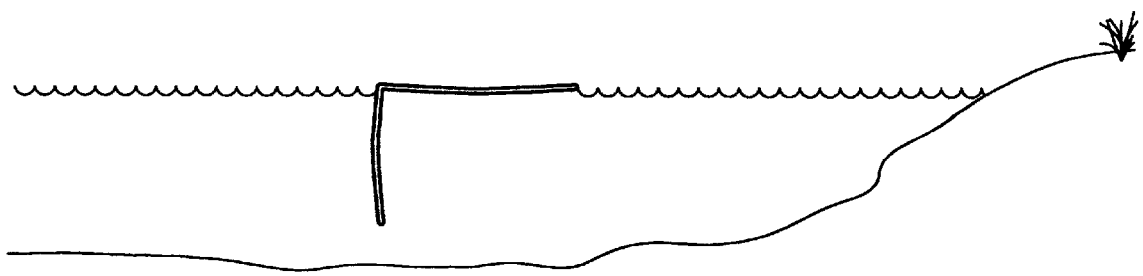

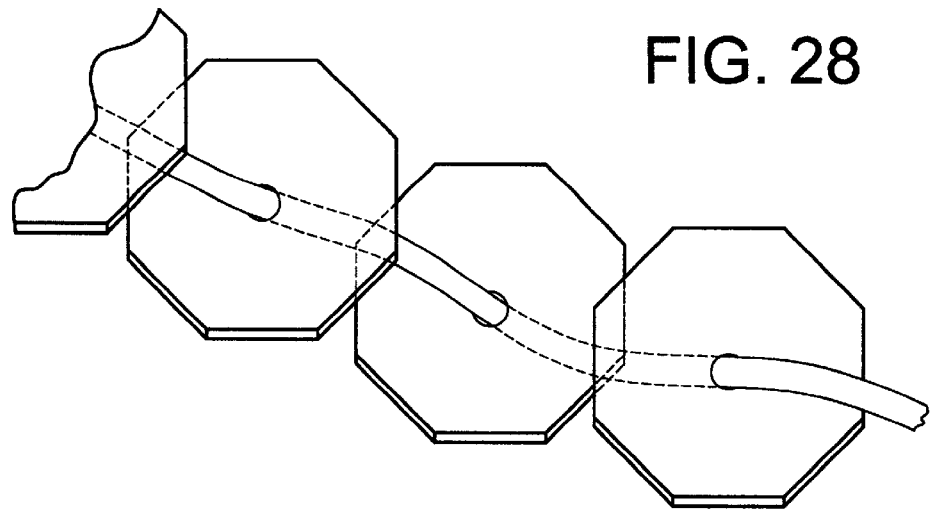
FIG. 28
FIG. 29
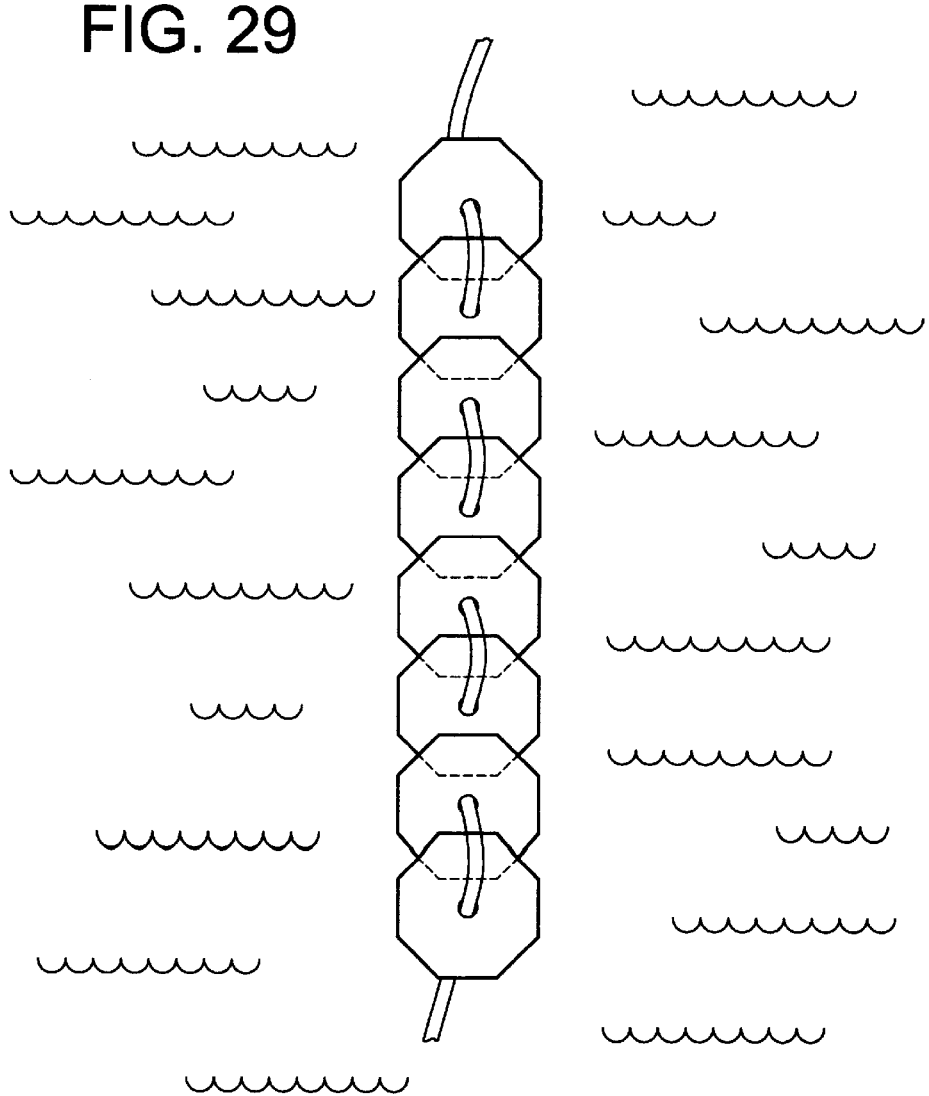

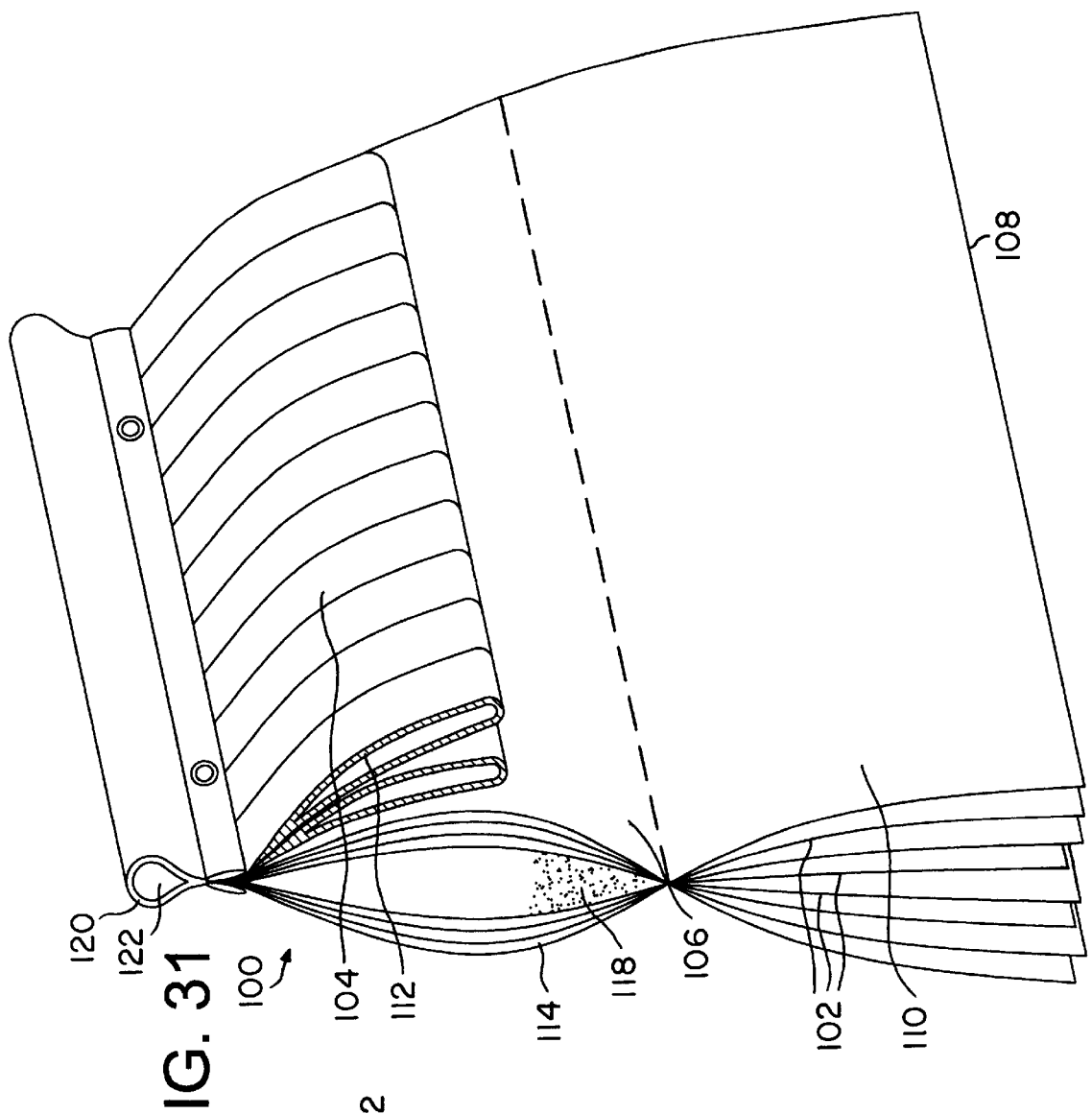
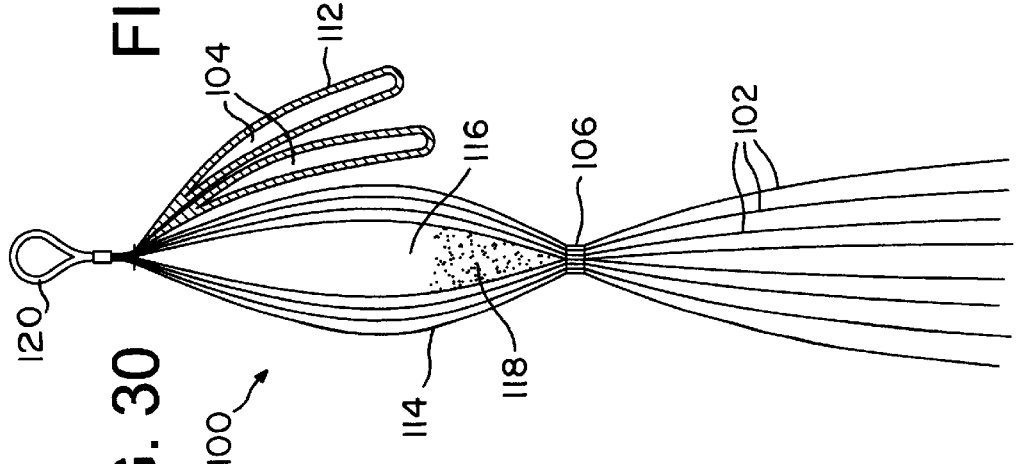

5,961,823

1

OIL COAGULANT PRODUCTS AND METHODS OF USE THEREFOR

This application is a continuation-in-part of copending application Ser. No. 08/764,439, filed Dec. 12, 1996, now U.S. Pat. No. 5,837,146 which is a continuation-in-part of application Ser. No. 08/572,986, filed Dec. 15, 1995, now U.S. Pat. No. 5,746,925 which is a continuation-in-part of application Ser. No. 08/506,968, filed Jul. 28, 1995, now U.S. Pat. No. 5,698,139 which is a division of application Ser. No. 08/074,114, filed on Jun. 8, 1993 now U.S. Pat. No. 5,437,793, all of which are herein incorporated by reference in their entirety.

FIELD OF THE INVENTION

The present invention relates to the treatment of oil and asphalt slicks and spills on the surface of bodies of water.

In one particular aspect, the present invention relates to devices which may be used to confine, contain and/or control contaminating substances disposed in or on a liquid surface, such as an oil or asphalt slick on or near the surface of a body of water. More particularly this invention relates to devices such as booms, skimmers, fences or floatable barriers which generally float on water or other liquids. This invention also relates to devices which are treated with compositions that will coagulate and/or enhance the viscoelasticity of the spilled oil or asphalt such that the spilled oil or asphalt can be readily removed from the water surface.

In another particular aspect, this invention relates to methods of making and using compositions that will coagulate and/or enhance the viscoelasticity of the spilled oil or asphalt such that the spilled oil or asphalt can be readily removed from the water surface. The coagulant compositions are synthesized from particular combinations of an oil component selected from the group consisting of glyceride, fatty acids, alkenes and alkynes, and a polymer component, and may be further diluted with a solvent for ease of handling, and application. An oil mass coagulated by the instant compositions floats on the surface of the water and can be easily scooped or otherwise removed from the water. The composition can be applied directly to an oil spill, or, alternatively, can be impregnated upon a porous substrate, such as vermiculite, which is then spread upon the spill. Thus, a device according to the present invention may be made by coating or treating a porous substrate, such as polyethylene, with an oil coagulant composition, wherein the device is brought into contact with the spill.

BACKGROUND OF THE INVENTION

Unfortunately, repeated incidents of oil and asphalt spillage in both fresh and salt water are well known. Recent history has evidenced the disastrous results that are caused by oil spills. Spilled oil causes damage to marine life, contamination of the water itself, damage to the shoreline and damage to birds and other wild life that are dependent upon the contaminated water. In the case of an asphalt spill, the liquid asphalt usually cools quickly, solidifies, and then sinks below the water surface, necessitating expensive diving salvage operations to avoid becoming a biohazard. Because oil and asphalt spills cause great losses both environmentally and, of course, financially, compositions, methods of making compositions, and methods of using compositions that will control an oil or asphalt spillage such that the spilled material can be readily removed from a water surface are in great need.

Many methods of controlling oil spills have been devised in the past few years. For instance, mechanical devices such as fences, booms, and skimmers have been used to physically contain or remove oil that has been spilled on a water surface. In addition, various types of oil absorbents have also been used in the past, such as, for example, straw. Various chemical treatments have also been used to either contain or coagulate spilled oil. U.S. Pat. No. 3,755,189 to Gilchrist et al. teaches a composition for the control of oil floating on water that comprises a drying oil, a solvent and a catalyst used in combination as a composition that is able to confine oil that is floating on the surface of the water. In addition, U.S. Pat. No. 3,977,967 to Zall teaches a method of containing oil spills that uses a polymer of high molecular weight that is able to gel or coagulate the spilled oil so that the coagulated oil can be easily raked off the surface of the water.

The prior art compositions and methods of Gilchrist et al. and Zall provide moderately effective means for removing spilled oil from a water surface, especially in calm water conditions. However, a composition that is able to confine, coagulate, float and control spilled oil in both calm and rough choppy water has heretofore not been known. Due to the nature of oil and water, the lighter components of oil typically evaporate from the surface of the water in 24–28 hours, while the heavier components of the oil typically sink below the surface of the water and eventually form an emulsion with the water. Previous compositions and methods have been ineffective in removing the spilled oil from the water surface, especially in the rough water conditions which are typically prevalent in oil spill situations.

Blends of a soft elastomeric polymer with a glyceride, useful as adhesives and sealing compounds, are disclosed in Sterling, U.S. Pat. No. 3,067,154. These mixtures are a blend of 10 to 50 parts by weight of the final composition elastomeric polymer with 5 to 25 parts by weight of the final composition oil, and contain other ingredients such as talc, clay, and solvent. These mixtures have not been subjected to thermal reaction conditions, and would not function to coagulate oil on water so that the oil can be easily removed from the water.

SUMMARY OF THE INVENTION

In U.S. Pat. No. 5,437,793, a coagulant product is disclosed which comprises linseed oil chemically reacted with isobutyl methacrylate polymer, which is then diluted with a solvent, such as 2,2,4-trimethyl-1,3-pentanediol monoisobutyrate. The composition formed by the thermal reaction of the linseed oil with the isobutyl methacrylate polymer is a soft resinous product which, when diluted with the solvent, results in a mixture that can be sprayed onto an oil spill or otherwise introduced to the oil spill to coagulate the oil. Further experimentation has led to the discovery of new products produced from polymers and a variety of natural animal and vegetable oils, fatty acids, alkenes and alkynes.

The present invention thus concerns a composition which is the thermal reaction product of a polymer component with an oil component selected from the group consisting of glycerides, fatty acids, alkenes and alkynes. Depending upon the end use of the product, the reaction conditions can be adjusted to provide a "first endpoint" product or a "second endpoint" product. Preferred compositions are disclosed which comprise the thermal reaction products of methacrylate polymers with a glyceride derived from a variety of natural animal and vegetable oils, or the thermal reaction products of methacrylate polymers with a fatty acid or alkene or alkyne containing from about 8–24 carbon atoms. The combination of a methacrylate polymer component with any of these oil components can provide either a first or second endpoint product, depending upon the reaction conditions.

The term "first endpoint product" is used to describe the solubility product of the reaction which is a cooperative structure held together by many reinforcing, noncovalent interactions, including Van Der Waals attractive forces. The term "second endpoint product" is used to describe the product of the reaction which is the result of covalent bond formation between the polymer component and the oil component, as indicated by the change in molecular weight.

The present invention also concerns novel devices for use in the cleanup procedures attendant to oil spills, especially devices adapted to carry and to apply the compositions of the instant invention to such oil spills, and thus facilitate cleanup procedures.

It is therefore an object of the present invention to provide an oil coagulant composition, as well as methods of making and using the composition, particularly in the cleanup of various oils, such as fuel oil, crude oil, and non-detergent motor oil, and asphalt.

It is also an object of the present invention to provide compositions and devices that will coagulate both the heavy and light components of oil, and will float on the surface of the water, thereby preventing the heavier oil components from sinking beyond recovery, or forming an emulsion with the water.

It is also an object of the present invention to provide a method for making the coagulant polymer/oil composition of the present invention, which can then be further diluted with a suitable solvent to provide a coagulant product that can be applied to a substrate for use in spill cleanup.

It is a further object of the present invention to provide a composition that is able to coagulate spills at various temperatures and types of water in which the spill has occurred.

It is yet another object of the present invention to provide a coagulant composition that removes 99.9% of the oil spilled in water such that only a trace amount, if any, remains.

DESCRIPTION OF THE DRAWINGS

FIG. 2(a) is a top view of a preferred embodiment of a mat or pad material suitable for folding along axis a—a.

FIG. 2(b) is an exaggerated perspective view of the mat or pad of FIG. 2(a) suitable for folding along axis b—b.

FIG. 2(c) is an exaggerated perspective view of the mat or pad of FIG. 2(b) suitable for folding along axis c—c.

FIG. 2(d) is an exaggerated perspective view of the mat or pad of FIG. 2(c) shown sealed or sewn along the positions marked by an "x".

FIG. 2(e) is a side view of FIG. 2(d).

FIG. 2(f) is an alternate embodiment of the folded mat or pad of FIG. 2(d) having cut fingers.

FIG. 2(g) is a side view of FIG. 2(f) showing the bottom edges of the finger loops cut.

FIG. 3(a) is a perspective view of a preferred embodiment of a mat or pad suitable for forming a containment boom.

FIG. 3(b) is a side view of FIG. 3(a), shown without edge or spot sealing.

FIG. 3(c) is a preferred containment boom configuration formed from the mat or pad of FIGS. 3(a) and 3(b).

FIG. 5 shows a chromagram of the molecular weight determination of the product of Paragraph B of Example 1.

FIG. 6 shows a perspective view of an embodiment of the present invention in the configuration of a buoyant containment fence.

FIG. 7 shows an end view of the embodiment of the buoyant containment fence of FIG. 6.

FIG. 8 shows an end view of an embodiment of the buoyant containment fence of FIG. 6, further including an anchoring means.

FIG. 9 shows a perspective view of an embodiment of a weighted finger according to the present invention.

FIG. 10 shows an end view of another embodiment of a weighted finger according to the present invention.

FIG. 11 shows an end view of yet another embodiment of a weighted finger according to the present invention.

FIG. 12 shows a perspective view of a buoyant containment fence according to the present invention which includes stiffening means for maintaining the shape of the floatable portion.

FIG. 13 illustrates an end view of a contaminant device according to the present invention, wherein the device generally floats atop a body of liquid without touching bottom.

FIG. 15 shows a top view of a buoyant containment fence of the present invention, wherein the fingers and buoyant portion are generally planar.

FIG. 16 shows an end view of the fence of FIG. 15, wherein the arrow generally indicates at least a portion of the travel arc of at least one of the fingers.

FIG. 17 shows an end view of the fence of FIG. 15, wherein the fingers are disposed generally at right angles with respect to the floatable portion, and wherein the arrow generally indicates at least a portion of the travel arc of at least one of the fingers.

FIGS. 28–29 show another device according to the present invention comprising a plurality of octagonally-shaped pads deployed in a successive overlapping relationship.

FIG. 28 shows a partial isometric view of one embodiment of the present invention comprising a plurality of octagonally-shaped pads.

FIG. 29 illustrates a top perspective view of the device of FIG. 28 disposed in a body of liquid.

FIG. 30 shows an end cutaway view of a device according to the present invention comprising sheet members and loop members, wherein sand or other ballast means is disposed in an inside pouch.

FIG. 31 shows a perspective cutaway view of the device of FIG. 28.

DETAILED DESCRIPTION OF THE INVENTION

Figure 1A:
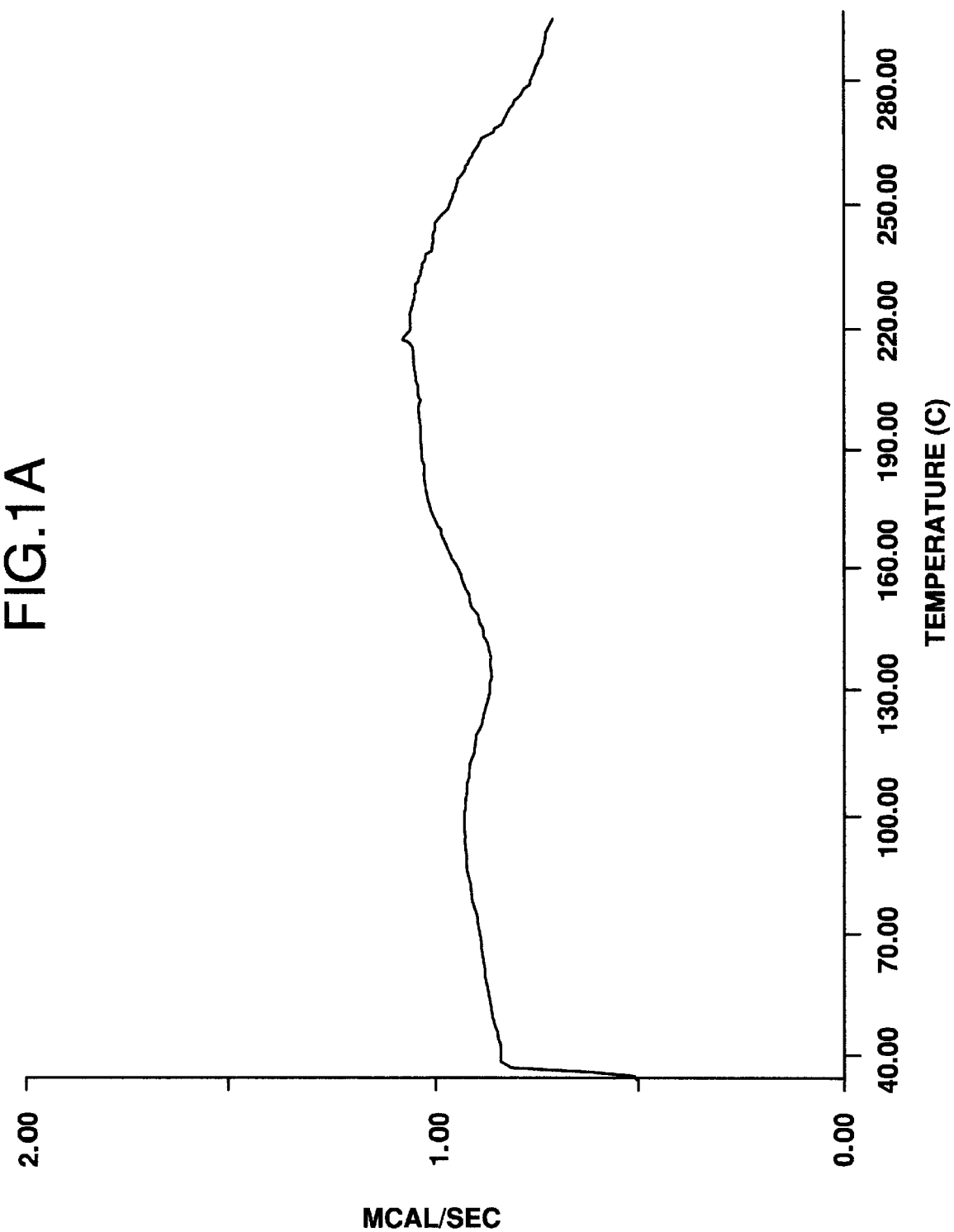
FIG. 1A is a differential scanning calorimetry (DSC) profile of the starting materials of Example 9.

In one aspect, the present invention concerns devices which may be used to confine, contain, and/or control one or more contaminants disposed in or on a liquid. For example, the present invention may be adapted to confine, contain, and/or control an oil or asphalt slick or spill on or near the surface of a body of water. The device may be made in the form of a boom, fence, skimmer, shield, or the like, which may be placed in contact with the supporting liquid and hence the contaminant. For example, the device may be placed in contact with a body of water so as to interact with any oil or asphalt which may be present in the water. The device may assume a variety of sizes. Furthermore, the present invention may comprise a device for contacting one or more contaminants in a liquid.

In a preferred embodiment, the present invention comprises a device for controlling at least one contaminant which is suspended by a liquid. The device comprises an immobilizing means for contacting the liquid and immobilizing the contaminant, wherein the immobilizing means has at least one immobilizing surface for interacting with the contaminant, and a carrier means for the immobilizing means for placing the immobilizing surface in contact with the liquid in a desired orientation. The immobilizing surface may function as a barrier or shield for restraining or limiting the dispersing of the contaminant in or on the liquid. Thus, the immobilizing surface may comprise a material to which the contaminant is adherent. In a particular embodiment, the immobilizing means thus comprises an oil adherent material. On the other hand, the immobilizing surface may comprise a material which at least partially repels the contaminant, whereby the immobilizing surface at least partially prevents movement of the contaminant in the liquid. For example, the present invention may be placed into a body of liquid and the portion of the immobilizing surface which is contaminant repellent tends to turn back or stop the contaminant within or on the liquid.

The immobilizing means may be at least partially buoyant when immersed in the liquid.

The device may also include a weighting means for maintaining at least a part of the immobilizing surface below the surface of the liquid. In another embodiment, the immobilizing means may include a weight receiving means, such as a pouch, adapted to hold a weight. Thus, the device may be used in combination with at least one weight. Typically, the weight may include some type of solid, such as metal, plastic, rocks, or sand.

The device may also include an anchoring means attached to the carrier means for anchoring the device in the liquid.

In one embodiment, the immobilizing means may include a surface portion for immobilizing one or more contaminants which are disposed substantially at the surface of the liquid. Preferably, the surface portion comprises a floatable or buoyant portion which may contact contaminants which float on or near the surface of the liquid. The surface portion is particularly well suited for unsteady or wavy or choppy liquids wherein, for example, a contaminant may be tossed or churned or rolled on or near the surface of the liquid.

The immobilizing means may also include a subsurface portion for immobilizing a contaminant which is disposed below the surface of the liquid. Thus, the subsurface portion may contact a contaminant which is disposed or which travels just below the surface, or substantially below the surface, of the liquid.

In a particular embodiment, the present invention comprises an immobilizing means having at least one surface portion and at least one subsurface portion.

In another particular embodiment, the immobilizing means may include a plurality of adjacent sheets. At least one of the sheets may be provided with a plurality of slits extending inwardly from a peripheral edge. Thus, the slits may divide at least one of the sheets into a plurality of strips or loops or fingers. The sheets are preferably made from non-woven polypropylene.

The immobilizing means may include at least one pad. The pad is preferably buoyant or floatable, and is preferably provided with at least one through hole. In this embodiment, the carrier means may include at least one connecting line which passes through the through hole. Thus, the device may include a plurality of pads which are connected by one or more connecting lines which pass through their respective through holes.

In yet another embodiment, the pad may include a plurality of accordion-like folds. Thus, the pad may be folded together for storage and/or transportation, then unfolded for deployment into a liquid. Preferably, the device includes a connecting line which passes through successive folds.

In a particular embodiment, the pad may comprise at least one buoyant pad and at least one non-buoyant pad. Preferably the buoyant pad is at least partially made from polyethylene, such as bubble pack polyethylene, and the non-buoyant pad is preferably at least partially made from non-woven polypropylene. Thus, the buoyant pad lies substantially at the surface of the liquid, while the non-buoyant pad is disposed generally beneath the surface of the liquid, although the non-buoyant pad may be displaced by the water or other means to a position at or near the surface of the liquid, or the non-woven pad may assume a position which is disposed substantially away from the surface of the liquid.

Another embodiment of the present invention includes a plurality of pads disposed in successive longitudinal relationship with respect to the carrier means. The pads may be spaced apart along the carrier means so as to substantially avoid contact between the pads.

Alternately, in a particularly preferred embodiment, the present invention includes a plurality of floatable, generally planar pads. The planar pads have a pair of opposed faces and an outer periphery defining the boundary therebetween. The carrier means preferably comprises a connecting line which passes through the opposed faces. Preferably, the outer periphery has a generally octagonal shape. At least one of the pads preferably overlaps at least one other of the pads when the device is deployed on the liquid. That is, as each pad is placed onto the surface of the liquid, one of the opposed faces generally lies flat against the surface of the liquid while the other opposed face is directed upwardly. Another pad, which is disposed in adjacent succession to the first pad, is placed into the liquid, wherein at least a part of the bottom surface or face of the second pad is placed on top of the upper surface or face of the first pad in an overlapping scale-like relationship. The pads are preferably adapted to overlap one another, at least partially, whenever the device is deployed in a liquid.

For example, even if one or more of the pads are rotated about the axis of the connecting line while an adjacent pad does not experience such rotation, the pads will nonetheless maintain an overlapping relationship. Therefore the pads are preferably disposed in a successive overlapping scale-like relationship when the device is deployed on the liquid, thereby providing a substantially continuous contaminant barrier or shield at the surface of the liquid.

In general, the pads may be fixedly attached to the carrier means. Alternately, the pads may be movably disposed on the carrier means, for example the pads may be slidably disposed on a connecting line which passes through one or more through holes provided in each pad.

Furthermore, each pad may be capable of contacting at least one adjacent pad. The pads may abut one another in an edge to edge relationship, or preferably in an overlapping manner. Thus, the device may serve as an uninterrupted contaminant barrier in the liquid.

The device may also be capable of being stored in a substantially self-stackable arrangement. For example, a device which comprises a plurality of discrete pads provided with through holes through which a connecting line is passed, may be stacked upon one another, wherein the connecting line may be pulled taut to remove any slack between the adjacent pads, or the connecting line may be substantially left in place between the pads in a loose or slack position.

In another embodiment, the pad may comprise a plurality of strips which are attached to the carrier means. The strips may be flexibly attached thereto.

Alternately, or in addition, the pad may comprise a plurality of loops attached to the carrier means.

Thus, the carrier means may comprise a connecting line disposed through the immobilizing means. In another embodiment, the carrier means may comprise at least one cylindrical master tube having a longitudinal axis. The master tube may be substantially made from the same material as the pad. The carrier means may further include a connecting line disposed within the master tube.

In a particularly preferred embodiment, the immobilizing surface comprises a porous substrate impregnated with a coagulant composition. The composition preferably comprises a homogenous thermal reaction product of an oil component and a polymer component. The porous substrate may be made from a floatable material, such as Styrofoam or polypropylene.

In another particularly preferred embodiment, the device comprises a material to which one or more contaminants is adherent.

In yet another particularly preferred embodiment, the device is preferably made from a material which has the capacity to absorb and hold an oil coagulant, and/or which can retain oil and/or asphalt.

In another particular embodiment, the present invention concerns a device for controlling an oil spill in a body of buoyant liquid. The device includes at least one strip and at least one pad depending from the strip, whereby the pad is capable of contacting the oil spill. The pad is preferably buoyant. Preferably, the pad is made in the form of a plurality of fingers, whereby the fingers are capable of contacting the oil spill. Further preferably, the fingers are adapted for oil adherence. Each of the fingers may comprise a loop, or a flat strip, or some combination thereof. The pad may comprise a porous substrate.

Other embodiments of the present invention involve the use of substrates which may be designed in the form of booms to contain and surround the oil spill in open waters or to surround and protect an object or location, such as the shore line, which is in contact with the water. Typically, when oil spillage occurs in open waters, it is critical to the environment to prevent the further travel or dispersion or scattering of the oil to the shore line. The floatable boom or fence may thus be impregnated with an oil coagulant composition which can be advantageously used to prevent the further soiling of the environment.

In another embodiment, the present invention concerns a device for controlling an oil spill in a buoyant liquid, wherein the device includes at least one cylindrical master tube having a longitudinal axis, wherein the tube is gathered together along first and second longitudinal inner surface lines and fixedly attached together there along, thereby forming adjacent first and second cylindrical tubes. One of the adjacent cylindrical tubes may be further divided into a plurality of loops. The master tube is preferably comprised of an oil adherent material. The other undivided loop may be fixedly flattened upon itself. The device may further include a plurality of adjacent master tubes, fixedly attached in side-by-side longitudinal relationship. The undivided loop may be adapted to receive a guide ring or other means of connection.

In another embodiment, a boom is shaped so as to provide means for controlling or containing or removing an oil spill from a buoyant liquid, by providing a strip of material, or rope, having a plurality of fingers comprised of a buoyant material depending from the strip. The fingers are adapted to float on the buoyant liquid and contact the oil or asphalt. Optionally, attachment means at the end of each strip, adapted so as to enable the coupling of more than one strip to another, can be included in the boom. The boom material may consist of a polyethylene, polypropylene or other floatable substance sheet material, folded and cut so as to provide the plurality of fingers. The fingers may be fashioned so as to provide loops attached to a strip of material or a rope material. The boom material may further be impregnated with an oil coagulant material. The boom may be manufactured in sections of convenient lengths, such as 10–12 foot lengths, and provided with attachment means so that a multitude of the booms may be connected to each other to form a containment boom of the necessary overall length.

Figure 3A:
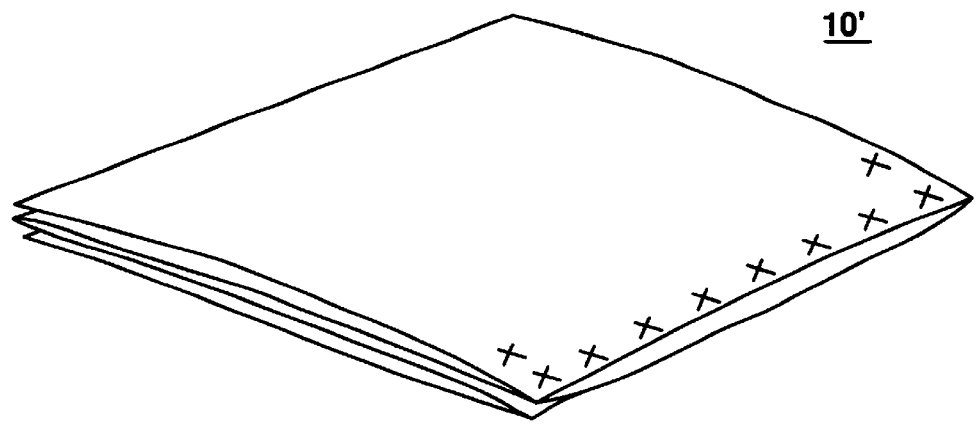
FIGS. 3(a)–3(c) show views of an embodiment of the present invention in a typical configuration of a containment boom, optionally impregnated with the coagulant composition of the instant invention, for use in the cleanup procedures of oil or asphalt spills.
Figure 3B:
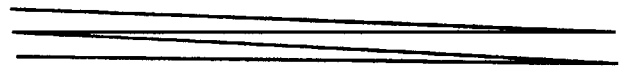
Figure 3C:
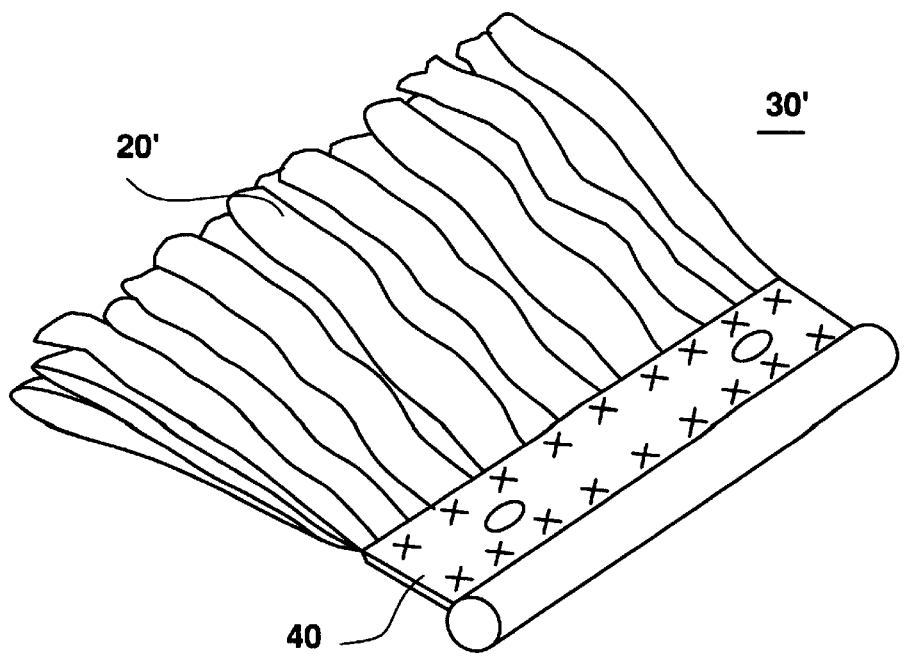
Figure 4A:
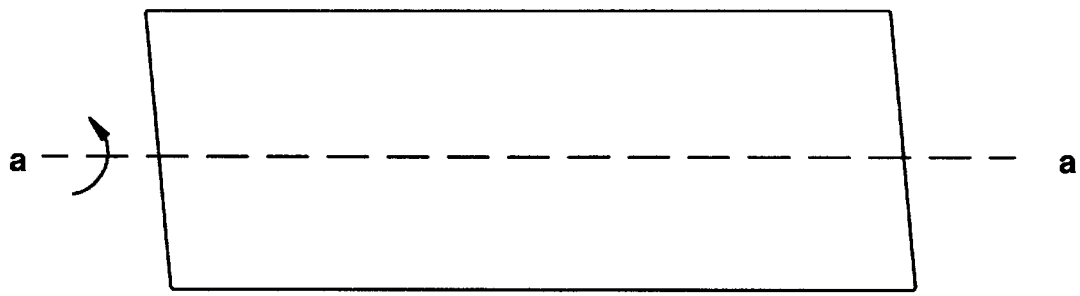
FIG. 4(a) shows a mat or pad according to the present invention suitable for folding along axis a—a.
Figure 4B:
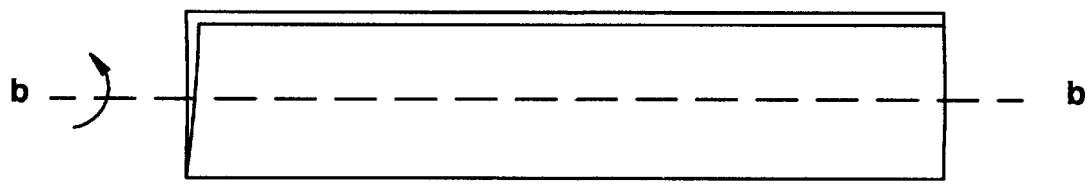
FIG. 4(b) shows the folded mat or pad of FIG. 4(a) suitable for folding along axis b—b.
Figure 4C:
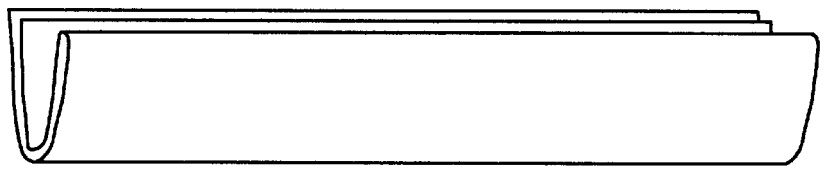
FIG. 4(c) shows the folded mat or pad of FIG. 4(b).
Figure 4D:
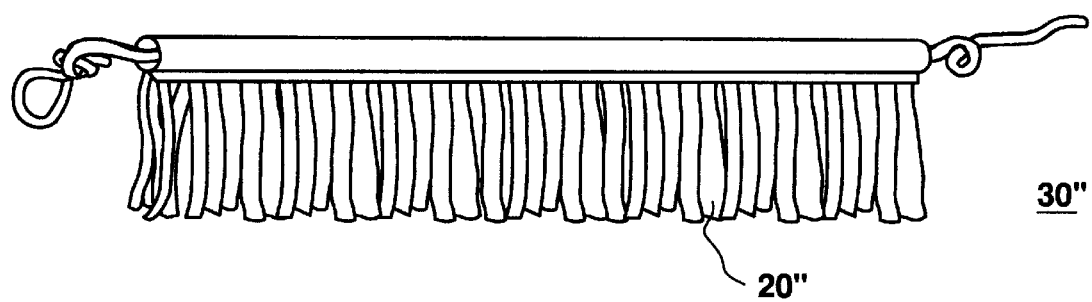
FIG. 4(d) shows a containment boom formed from the folded mat or pad of FIG. 4(c).

Yet another preferred embodiment of the present invention is shown in FIGS. 3(a)–3(c). A mat or pad material or sheet is folded with accordion-like folds, as best seen in FIG. 3(b), and is preferably sealed along one or more edges or corners as indicated, for example, by the small crosshatches in FIG. 3(a), to form a mat or pad which may be cut into a plurality of fingers or loops as seen in FIG. 3(c), thereby forming a containment boom configuration.

Another preferred embodiment is shown in FIGS. 4(a)–4(d). The mat or pad material is folded and cut, forming a containment boom having a plurality of fingers or loops. A connection line passes through the tubular section or tubular strip.

In another embodiment, the present invention relates to a device for removing an oil spill from a buoyant liquid, the device including at least one cylindrical master tube of oil adherent material having a longitudinal axis, wherein the tube is gathered together along first and second longitudinal inner surface lines and fixedly attached together there along. First and second adjacent cylindrical tubes are formed which are joined at a longitudinal intersection line. One of the adjacent cylindrical tubes is cut along a longitudinal line opposite the longitudinal intersection line, thereby forming first and second longitudinal flaps depending from the intersection line, wherein at least one flap is divided into a plurality of fingers.

In yet another embodiment, the present invention concerns a buoyant containment fence comprising a generally planar floatable portion having a peripheral edge, and a peripheral portion attached to the peripheral edge of the floatable portion. The peripheral portion may also be made buoyant or floatable. In particular embodiments, it may be desirable to make the peripheral portion less buoyant than the floatable portion. For example, the peripheral portion may be weighted. Thus, the peripheral portion may sink in water and tend to assume a generally vertical position as the top end is attached to the floatable portion. Preferably the peripheral portion includes a plurality of finger members. The finger members may include loops, strips, or some combination thereof.

In still another embodiment, the present invention concerns a containment boom which has at least one buoyant pad provided with at least one through hole and at least one connecting line which passes through the through hole. The connection means may include at least one connecting line which connects the pads. The pads may be adapted to be substantially self-stackable. Thus the device may be stored or transported in a stacked position and deployed as needed. Preferably the connecting line is flexible in order to facilitate the storage of the device.

In another aspect, the present invention concerns a method of making a novel composition, the composition itself, and a method for using the composition to coagulate oil spills. The instant composition is readily synthesized from a polymer component and an oil component selected from the group consisting of glycerides, fatty acids, alkenes and alkynes. In a preferred embodiment, the coagulant product is synthesized from an isobutyl methacrylate polymer, and the oil component is one derived from a natural oil, such as linseed oil or sunflower oil. Optionally, the coagulant composition is then diluted with a solvent, such as 2,2,4-trimethyl-1,3-pentanediol monoisobutyrate or acetone. If desired, the diluted coagulant composition can then be applied to a solid adsorbent or absorbent recovery substrate which is then applied to the surface where the oil spill has occurred.

The polymer component of the composition is a synthetic polymer such as polymers derived from methacrylates. Preferably, the polymer is derived from methyl methacrylate, ethyl methacrylate, isobutyl methacrylate, or n-butyl methacrylate, or may be a copolymer containing a methacrylate polymer. Most preferably, the polymer is a poly(isobutyl methacrylate) polymer such as that obtainable from ICI Acrylics as ELVACITE® 2045, or a methacrylate/methacrylic acid copolymer such as ELVACITE® 2008 or 2043. However, it is anticipated that other equivalent polymers can be used to prepare equivalent compositions of the invention. Combinations of polymers can be used to advantage in the process of the instant invention.

The test used to determine whether or not a polymer can be used in accordance with the present invention is to combine the polymer component in question with the oil component, as set forth herein, to see if the resultant combination forms a homogenous product after heating. Ideally, the polymer component percentage of the composition should range from about 15–75%, preferably 20–40%, or more preferably from about 25–35%, by weight.

In one embodiment of the present invention, the oil component of the composition is a glyceride derived from oils of vegetable or animal origin. Vegetable oils are obtained by cold pressing the seeds of a plant to obtain the oil contained therein. Of the vegetable oils, drying oils such as sunflower, tung, linseed, and the like; and semi-drying oils, such as soybean and cottonseed oil, have been shown to be useful as the glyceride component of the invention. Animal oils, such as, for example, fish oil, tallow and lard can also be used as a glyceride component of the invention. It is anticipated that any drying oil or semi-drying oil will work in the invention. Generally, a drying oil is defined as a spreadable liquid that will react with oxygen to form a comparatively dry film. Optionally, combinations of two or more glycerides can be used as reactants with the polymer in the process of the invention to provide oil coagulant compositions useful in the methods of the present invention.

In a preferred embodiment, the oil component of the composition is a glyceride derived from a drying oil, such as linseed oil, that can be obtained from Cargill, Inc. as Supreme Linseed Oil, or sunflower oil. The glyceride should comprise from about 25–85%, preferably about 60–80%, and most preferably, from about 65–75% of the coagulant composition. All percentages in this disclosure are by weight, unless otherwise stated.

Where the oil component of the composition of the present invention is a fatty acid or alkene or alkyne utilized as the reactant with the polymer, it contains from about 8 to 24 carbon atoms, and preferably from about 10 to 22 carbon atoms. Such fatty acids, alkenes and alkynes are commercially available from many suppliers. Typical fatty acids include both saturated and unsaturated fatty acids, such as lauric acid [dodecanoic acid], linolenic acid, cis-5-dodecanoic acid, oleic acid, erucic acid [cis-docosanoic acid], 10-undecynoic acid, stearic acid, caprylic acid, caproic acid, capric acid [decanoic acid], palmitic acid, docosanoic acid, myristoleic acid [cis-9-tetradecenoic acid], and linoleic acid. Typical alkenes and alkynes contain at least one and preferably one or two degrees of unsaturation, and from about 8 to 24 carbon atoms, with 10–20 carbon atoms being preferred. Preferred alkenes and alkynes are those such as 1-decene, trans-5-decene, trans-7-tetradecene, 1,13-tetradecadiene, 1-tetradecene, 1-decyne, and 5,7-dodecadiyne.

The process of the instant invention produces a product with characteristics different from either of the starting materials or a simple mixture of the two starting materials, thus showing that a new composition is produced by the thermal reaction. Specifically, oil/polymer coagulant compositions of the present invention pass a clear pill test after being heated at the elevated temperatures and do not separate into two parts upon being cooled but, rather form a homogenous, uniphase compound.

The resultant coagulant composition can be used by itself in some applications or it can be diluted with a solvent. The amount of solvent used will vary depending upon the relative percentage of the oil component in the coagulant composition. For example, if more oil component is present, the composition will be more fluid and less solvent need be used. The solvent, or diluent, component of the coagulant product should generally comprise any liquid or mixture of liquids that is able to dissolve or dilute the coagulant composition. The solvent/diluent should control the evaporation, desired flow and coalescing of the intermediate composition. And, in consideration of marine life, the toxicity of the solvent must be considered. More specifically, the solvent can be selected from aliphatic hydrocarbons, aromatic hydrocarbons, alcohols, ketones, ethers, aldehydes, phenols, carboxylic acids, synthetic chemicals and naturally occurring substances.

In one embodiment, the solvent component of the coagulant can also be a previously specified glyceride where the coagulant composition is approximately 100 percent solids. In this case, toxicity from solvents is virtually eliminated and a product that is extremely viscous is formed that can be useful in certain applications.

In a preferred embodiment, the solvent is 2,2,4-trimethyl-1,3-pentanediol monoisobutyrate or acetone. When a solvent is utilized, it is preferably used in an amount which is about 50% of the coagulant product, although the total solvent percentage of the coagulant/solvent product can range from about 35 to about 95%.

The coagulant composition of the present invention is prepared by a thermal reaction process. The first step of the process involves heating the oil component (glyceride or fatty acid or alkene or alkyne) to approximately 235–350° F. at a rate of about 5° F. per minute with continuous stirring. Then, the polymer component, usually in powdered form, is slowly stirred into the heated oil component. Depending upon the particular reactants used, the oil component should range from about 25–85%, preferably about 65–80%, more preferably about 72–77%, and the polymer should range from about 1–50%, preferably about 20–40%, more preferably about 23–28%, of the coagulant composition. After this mixture has been mixed properly, the mixture should be heated to approximately 400–700° F., depending on the particular components utilized for the reaction, and the desired endpoint of the reaction. Typically, reaction temperatures below about 500° F. produce "first endpoint products" while temperatures above about 500° F. produce "second endpoint products".

The mixture should be heated at that temperature until a clear pill test indicates that the reaction has reached its first end point, i.e., a drop of the reaction mixture when placed on a clear glass plate is clear. When a clear pill test indicates that the reaction has reached its first end-point, the mixture should be cooled to a temperature below 200° F., generally about 180° F. After cooling the coagulant product can be diluted with a suitable solvent to form a more liquid product that is easier to handle and use. The temperature at which the solvent is added is not critical, but the solvent should be added at a temperature where the coagulant composition is still pliable and the solvent will not rapidly evaporate.

Two reactions appear to occur between the oil component and the polymer component based upon the temperature and time. The first endpoint of the reaction results in a rubbery viscoelastic, relatively soft product with a melting point in the range of 100° F. to 250° F. This first endpoint product is homogeneous and does not separate upon melting or dissolution. This reaction occurs at 350° F.–500° F. This is designated the "first endpoint product" (solubility product).

In the second reaction, the polymer undergoes complete or partial chain fission into discrete polymer free radicals at a temperature above about 500° F. At between 350° F. to 500° F., it is believed that partial chain fission of the polymer component (isobutylmethacrylate polymer has a m.w.=300,000 Daltons) occurs at the end of the chain or in the middle. This results in a lower molecular weight product. It is believed that there may also be a solubility reaction occurring (similar to Sn and Pb forming solder) within the ternary composition. The occurrence of a chemical reaction is confirmed, however, due to the change of molecular weight.

Reactions at above 500° F. and up to 900° F. maintained at temperature from 5 minutes to 20 hours, depending on activation energy of compositions, result in the second endpoint product. This reaction is visually observable by color, rheology, and specific heat change in the product [Note: For the first endpoint product the end of the reaction is observed by change in color and a rheology change and the cessation of solution outgassing. There is also a change in specific heat as measured by Differential Scanning Calorimetry]. The second endpoint product has a weight average molecular weight in the range of about 62,000 Daltons which is consistent with complete chain fission of the polymer, resulting in smaller free radicals which results in a lower molecular weight compound. The melting point of these products is usually above 300° F. if the oil component is highly unsaturated, which results in a solid product due to the formation of highly bonded three dimensional densely packed molecular matrix. If the oil component has a low degree of unsaturation, the resultant product is usually liquid, which is consistent with this type of reaction.

The oily component and the polymer component are reacted in a thermal reaction that does not appear to be sensitive to the atmosphere under which the reaction is carried out, i.e., whether it is an inert, oxidizing or reducing atmosphere. Coagulant compositions have been prepared by this reaction which range from soft to hard, and elastomeric to brittle in nature depending upon the ratio of the oil component to the polymer component and the choice of the polymer component and/or the oil component used.

If the reaction mixture separates into two phases upon cooling it is not useful as a coagulant. In this manner, any polymer can be identified for use in the invention.

The diluted coagulant composition made according to the above-described process generally has the following properties:

boiling point: variable, depending upon ingredient types and amounts appearance: pale yellow clear oily liquid odor: very mild, characteristically oily water solubility: negligible non-volatile material: 0–50% flash point: variable, depending upon ingredient types and amounts (>140° F., with solvent; higher without solvent)

flammability: combustible liquid viscosity: 230–4740 cps

To use the coagulant composition of the instant invention, it can be applied directly to an oil-laden surface, or can be first diluted with any appropriate solvent, and then sprayed or otherwise dispersed upon an oil spill. The composition coagulates the spilled oil such that the coagulated oil floats on the surface of the water. Alternatively, the diluted composition can be introduced onto a porous substrate, whereupon the solvent will evaporate, leaving the oil/polymer composition impregnated in the substrate. This impregnated substrate can then be spread upon an oil spill where it causes coagulation of the oil and allows for easy collection of the coagulated oil, which typically floats on the surface of the water.

The polymer/oil coagulant composition can be used to coagulate spilled oil and to cause the coagulated oil to float through a process of generally applying the composition to the surface of the oil spill. The composition can be handled more easily when it is diluted with an appropriate solvent, but in certain cases it can be preferable to apply the polymer/oil coagulant composition directly. The diluted coagulant product can be sprayed on top of the oil spill from a plane or boat, or the coagulant can be introduced at only one site, or an edge of the spill. When the coagulant is sprayed on top of the oil spill, no agitation is required in order for the coagulant to coagulate the spilled oil. When the coagulant is introduced at a site of the oil spill, however, agitation may be required depending upon the wave action of the water in combination with the properties of the coagulant, i.e., the wave action can be sufficient to spread the coagulant throughout the oil spill. Preferably, the amount of coagulant used in terms of the amount of spilled oil should be from about 1 to about 15% of the weight of spilled oil.

Our studies have shown that if, as compared to the amount of oil spilled, an amount of coagulant equal to 5% of the spilled oil is used, the coagulant will remove 99% of the spilled oil. If an amount of coagulant is used that is equal to 10 to 15% of the spilled oil, the coagulant will remove 99.9% of the spilled oil. When 99.9% of the spilled oil has been coagulated and removed, only a trace amount of oil remains in the water.

A unique feature of the present coagulant and the methods of using the coagulant is that no agitation is required to mix the coagulant with the spilled oil when the coagulant is sprayed on top of the oil spill. In addition, as stated, if the coagulant is introduced at the side of the spill, depending upon the wave action of the water in combination with the nature of the coagulant used, agitation may not be required because the wave action may be sufficient to disperse the coagulant throughout the spill. And, when agitation has been used to simulate very rough waters, the coagulant acts very quickly (less than one (1) minute) to coagulate both the light and heavy components of the spilled oil despite extreme agitation.

Another unique feature of the invention is that both the polymer/oil coagulant compositions of the present invention and the resulting coagulated oil mass float on top of the water and remain on the surface of the water despite tremendous agitation or wave motion. This flotation aspect of the present invention makes it easier to remove the coagulated oil from the water. Thus, an oil spill may be contained by a device according to the present invention and subsequently removed from the water without the necessity of retrieving submerged clumps of the spilled oil or asphalt material.

In addition, our studies have also shown that the coagulant and methods of using the same will coagulate oil that has been spilled on water regardless of water or air temperature, and the coagulant works in both salt water and fresh water. After the coagulant has coagulated the spilled oil, the floating admixture should simply be removed from the water by any mechanical means such as, for example, scooping type devices, that are well-known in the art.

Another method of using the coagulant product is to impregnate it in or on a porous substrate that is then distributed across an oil spill. The porous substrate can be any substrate having a high surface area and the capacity to carry or absorb the product. However, the porous substrate should not negatively affect the coagulation process or chemistry of the coagulant product. Examples of suitable substrates are vermiculite, wood shavings or chips, wood pulp, paper, STYROFOAM® (expanded polystyrene), silicas, kaolin, chicken feathers, zeolite, aluminas, calcium carbonate, and natural and synthetic fibers, especially those derived from cellulose, polyethylene or polypropylene.

The compositions can be applied to the porous substrate in either a neat or diluted solution, depending upon the particular coagulant composition being utilized. The composition (or diluted composition) is sprayed onto or mixed with the substrate at ratios from about 10% to 200% w/w composition/substrate. The impregnated substrate is then dried. It is anticipated that the impregnations could be accomplished on a larger scale using equipment such as a Henshel mixer or V-blender.

In particularly preferred embodiment of the present invention, the coagulant compositions are applied to particular substrates designed for optimal cleanup of certain oil cleaning situations. In particular, mats and pads of non-woven polypropylene can be utilized as substrates for the coagulant compositions. These mats and pads, in a variety of sizes and configurations, can then be utilized for specific cleanup operations where it is necessary to wipe various surfaces to cleanup the oil. Such mats and pads are particularly advantageous in removal of oil from affected wildlife, machinery and solid surfaces which have come into contact with the water where the oil spill has occurred.

A first preferred mat or pad configuration 10 is shown in FIGS. 2(a)–2(g). Mat or pad material is folded along axis a—a, then along axis b—b and c—c, as seen in FIGS. 2(a)–(d). One or more edges or corners may be sealed or sewn together as indicated, for example, by the x's in FIG. 2(d). A preferred pad of the present invention contains foldings such that it can be unfolded preferably up to 8 to 12 times its unfolded size. This has a number of unexpected benefits in the usage of this embodiment. First of all, less pads are utilized since each one covers a greater surface area. Secondly, waste is reduced and disposal costs of the pad and its absorbed oil is substantially reduced due to the lesser number of pads which are required in a particular situation.

Alternately the mat or pad 10 may be cut into a plurality of fingers 20 which may include loops or flat strips formed from cutting into the folded mat or pad configuration 10, thereby forming a containment boom 30.

Another preferred embodiment involves the use of substrates which are designed in the form of booms or fences or skimmers to contain and surround the oil spill in open waters, or to surround and protect an object or location, such as a shoreline, which contacts the water. Typically, when oil spillage occurs in such waters, it is critical to the environment to prevent the further travel or dispersion or scattering of the oil to the shoreline. In such cases, a floatable boom impregnated with the oil coagulant composition can most advantageously be utilized to prevent the further soiling of the environment.

In a highly preferred embodiment, the boom is shaped so as to provide means for controlling or containing or removing an oil spill from a buoyant liquid, by providing a strip of material, or rope, having a plurality of fingers comprised of a buoyant material depending from said strip, wherein said fingers are adapted to float on the buoyant liquid and contact the oil. Optionally, attachment means at the end of each strip, adapted so as to enable the coupling of more than one strip to another, can be included in the boom. Typically, the boom material consists of a polyethylene, polypropylene or other floatable substance sheet material, folded and cut so as to provide the plurality of fingers. In an especially preferred embodiment the fingers are fashioned so as to provide loops attached to a strip of material, or a rope material. This boom material is then impregnated with the oil coagulant material of the present invention. Typically, the boom is manufactured in sections of convenient lengths, such as 10–12 foot lengths, and provided with attachment means so that a multitude of the booms can be connected to each other to form a containment boom of the necessary length.

Yet another preferred containment boom configuration is shown in FIGS. 3(a)–3(c). A mat or pad material or sheet is folded with accordion-like folds, as best seen in FIG. 3(b), and is preferably sealed along one or more edges or corners 40 as indicated, for example, by the crosshatches in FIG. 3(a), to form a mat or pad 10, which may be cut into a plurality of fingers or loops 20' as seen in FIG. 3(c), thereby forming a containment boom configuration 30'. Another preferred embodiment is show in FIGS. 4(a)–4(d). Mat or pad material is folded and cut, forming a containment boom 30" having a plurality of fingers or loops 20". A connection line passes through the tubular section or tubular strip.

Still another highly preferred embodiment of the present invention involves the composition of the present invention applied to a floatable substrate such as wood chips, STYROFOAM®, polypropylene or polyethylene material. Uniquely, such products, when applied to oil or asphalt spills on water, result in the floatation of the spilled oil or asphalt, even under conditions where the oil or asphalt would normally sink from the water surface, and become a further, more permanent biohazard, removable only by diving salvage crews. For instance, when the thermal reaction product of methacrylate polymer with linseed oil is applied to a boom such as described hereinabove at a rate of about 1–15%, liquid asphalt and Group 5 heavy oils are retained at the water surface where they can be easily removed by mechanical means, and without expensive diving salvage operations which would otherwise be necessary for the cleanup of such spills.

The following examples demonstrate various combinations of oil components, polymer components, and solvents that give the desired properties of the invention. The examples demonstrate exemplary embodiments of the present invention and are not intended to be construed as limiting the scope of the invention.

EXAMPLES

Example 1

A. 1000 g of linseed oil is charged to a closed batching reaction flask, equipped with stirring apparatus. The stirring is initiated, and the flask is heated to 235° F. at a rate of 4° F. per minute. When the temperature reaches 235° F., 340 g of du Pont Elvacite® 2045 isobutyl methacrylate polymer is slowly charged. The flask is then continuously heated to a temperature range of 425–450° F. at a rate of 2° F. per minute with continuous stirring. While heating, clear pill tests are conducted to determine the reaction endpoint. When a clear pill test indicates that the reaction is complete, it is then cooled down by removal of the heating mantel. This composition can then be used as an oil coagulant composition.

Analysis of this material indicates mn=number average molecular weight=111,445 mw=weight average molecular weight=228,068 mz=Z average molecular weight=417,463

B. To obtain the "second endpoint product", this reaction can be continued by heating the material to a temperature of about 546° F. and maintaining this temperature for a period of about 30 minutes. The solution undergoes a second color change to dark amber. Upon cooling, the solution remained liquid.

Analysis of this material gives two peaks in the molecular weight chromatogram shown in FIG. 5. Reintegration of these peaks gives the following results:

mn=number average molecular weight=1267 mw=weight average molecular weight=62078 mz=Z average molecular weight=424877

C. In an optional step, when the reaction detailed in Paragraph B reaches approximately 180° F., 1340 g of 2,2,4-trimethyl-1,3-pentanediol monoisobutyrate is added. Cooling is continued down to 150° F. The batch is then filtered using a 200 micron filter bag, cooled to room temperature and stored. This composition can also then be used as an oil coagulant composition, particularly for application to a solid substrate.

Repetition of the procedures detailed in Example 1, but substituting the types and amount of ingredients enumerated in Examples 2–20 below, and noting any change in reaction conditions such as the type of atmosphere used during the conduct of the reaction, various oil coagulant compositions are prepared. In each of the various compositions, the listed solvent can be an optional diluent.

Example 2 oil component: 1000 g soybean oil polymer component: 340 g methyl methacrylate polymer atmosphere: $N_2$
solvent: 1340 g anhydrous isopropanol

Example 3 oil component: 1000 g soybean oil
polymer component: 1000 g isobutyl methacrylate polymer
atmosphere: $N_2$
solvent: 2000 g 2,2,4-trimethyl-1,3-pentanediol monoisobutyrate

Example 4 oil component: 1000 g linseed oil
polymer component: 680 g ethyl methacrylate/methacrylate copolymer
atmosphere: $CO_2$
solvent: 1680 g 2,2,4-trimethyl-1,3-pentanediol monoisobutyrate

Example 5 oil component: 1000 g linseed oil
polymer component: 680 g isobutyl methacrylate polymer
atmosphere: air
solvent: 1680 g, 2,2,4-trimethyl-1,3-pentanediol monoisobutyrate

Example 6 oil component: 1000 g linseed oil
polymer component: 500 g isobutyl methacrylate
atmosphere: $CO_2$
solvent: 1500 g 2,2,4-trimethyl-1,3 -pentanediol monoisobutyrate

Example 7 oil component: 1000 g sunflower oil
polymer component: 1000 g isobutyl methacrylate polymer
atmosphere: $N_2$
solvent: 2000 g propylene glycol monomethyl ether

Example 8 oil component: 1000 g sunflower oil
polymer component: 340 g isobutyl methacrylate polymer
atmosphere: air
solvent: 340 g 2,2,4-trimethyl-1,3-pentanediol monoisobutyrate

Example 9 oil component: 1000 g tung oil
polymer component: 340 g isobutyl methacrylate polymer
atmosphere: $N_2$
solvent: 1340 g 2,2,4-trimethyl-1,3-pentanediol monoisobutyrate

Example 10 oil component: 1000 g soybean oil
polymer component: 340 g isobutyl methacrylate polymer
atmosphere: air
solvent: 1340 g propylene glycol monomethyl ether

Example 11 oil component: 1000 g tung oil
polymer: 440 g ethyl methacrylate/methacrylate copolymer
atmosphere: $CO_2$
solvent: 1440 g 2,2,4-trimethyl-1,3-pentanediol monoisobutyrate

Example 12 oil component: 1000 g sunflower oil
polymer component: 680 g isobutyl methacrylate polymer
atmosphere: $CO_2$
solvent: 1680 g 2,2,4-trimethyl-1,3-pentanediol monoisobutyrate

Example 13 oil component: 1000 g linseed oil
polymer component: 340 g n-butyl methacrylate
atmosphere: air
solvent: 1340 g isopropanol

Example 14 oil component: 1000 g fish oil
polymer component: 340 g isobutyl methacrylate
atmosphere: air
solvent: 1340 g isopropanol

Example 15 oil component: 1000 g tung oil
polymer component: 340 g n-butyl methacrylate
atmosphere: air
solvent: 1340 g isopropanol

Example 16 oil components: 500 g tung oil and 500 g fish oil
polymer component: 340 g isobutyl methacrylate
atmosphere: air
solvent: 1340 g isopropanol

Example 17 oil components: 500 g tung oil and 500 g linseed oil
polymer components: 340 g n-butyl methacrylate 170 g isobutyl methacrylate
atmosphere: air
solvent: 1340 g isopropanol

Example 18 oil component: 500 g fish oil and 500 g sunflower oil
polymer component: 170 g n-butyl methacrylate
170 g isobutyl methacrylate
atmosphere: air
solvent: 1340 g isopropanol

Example 19 oil component: 500 g soybean oil and 500 g tung oil
polymer components: 170 g n-butyl methacrylate
170 g isobutyl methacrylate
atmosphere: air
solvent: 1340 g isopropanol

Example 20 oil components: 500 g fish oil and 500 g soybean oil
polymer: 170 g n-butyl methacrylate 170 g isobutyl methacrylate
atmosphere: air
solvent: 1340 g, isopropanol

Example 21

Each of the above Examples 2–12, after the addition of solvent, was mixed with 1) vermiculite; 2) packing paper; 3) wood chips, and 4) STYROFOAM®. The compositions were added to the substrates at weight to weight ratios of 20% (vermiculite), 200% (paper), 20% (wood chips) and the saturation point (STYROFOAM®). The solutions were mixed with the substrate and the so-impregnated substrate was dried.

Example 22

The protocol of Example 21 was carried out on the compositions of Examples 2, 6, 10, 11 and 12, excluding the addition of the solvent thereto. The polymer/glyceride coagulant compositions were added to the substrate when the composition was still warm and liquid at weight to weight ratios of 10% (vermiculite), 100% (paper), 10% (wood chips) and the saturation point (STYROFOAM®).

Example 23

Coconut oil (a non-drying oil) was used in 3:1 and 1:1 ratios with isobutyl methacrylate polymer and in a 4.2:1 ratio with ethyl methacrylate/methacrylate copolymer. The coconut oil/ethyl methacrylate/methacrylate copolymer combination separated out upon cooling and was thus not useful. The coconut oil combinations which formed a homogenous product did function as a coagulant compositions.

Repetition of the procedures detailed in Example 1, but substituting the types and amount of ingredients enumerated in Examples 24–30 below, and noting any change in reaction conditions such as the type of atmosphere used during the conduct of the reaction, various oil coagulant compositions are prepared. In each of the various compositions, no solvent is utilized.

Example 24 oil component: 340 g linseed oil
polymer: 1000 g ethyl methacrylate/methacrylate copolymer
atmosphere: $N_2$

Example 25 oil component: 1000 g linseed oil
polymer: 500 g ethyl methacrylate/methacrylate copolymer
atmosphere: air

Example 26 oil component: 1000 g linseed oil
polymer: 500 g methyl methacrylate/methacrylate copolymer
atmosphere: $CO_2$

Example 27 oil component: 1000 g sunflower oil
polymer: 340 g ethyl methacrylate/methacrylate copolymer
atmosphere: $CO_2$

Example 28 oil component: 1000 g sunflower oil
polymer: 340 g ethyl methacrylate/methacrylate copolymer
atmosphere: $N_2$

Example 29 oil component: 1000 g sunflower oil
polymer: 1000 g ethyl methacrylate/methacrylate copolymer
atmosphere: air

Example 30 oil component: 1000 g soybean oil
polymer: 1000 g ethyl methacrylate/methacrylate copolymer
atmosphere: air

Example 31
Test Results of Oil Coagulant Compositions

The combinations of Examples 1 and 2 yielded homogenous glyceride/polymer compositions that did not separate into two component mixtures upon cooling. The glyceride/polymer compositions dissolved readily into the solvent to yield oily liquids ranging in viscosity from about 230 to 4740 cps.

Samples of the glyceride/polymer/solvent coagulant products prepared according to Examples 1–2 were supplied to Leberco Testing Incorporated to determine the ability of the composition to coagulate spilled oil. The coagulant product was evaluated for its coagulating properties in cold fresh water and cold simulated salt water in which an oil spill was simulated. The coagulant was evaluated for its ability to remove non-detergent motor oil; number 6 fuel oil; heavy crude bottoms; sour crude; sweet crude; and number 2 fuel oil.

The testing procedure used tap water at 20° C. and at 10° C. and simulated salt water prepared in accordance with ASTM D1141 (Substitute Ocean Water) also at 20° C. and 10° C. The oil concentration on the water was at 1–10% of the water volume. The coagulants were evaluated at from 1–15% by volume of the oil concentration with agitation times ranging from 1–3 minutes and coagulation times at 0.5 and 2 minutes. Following the addition of the coagulant and the agitation, and after the coagulation time allowed, the oil-coagulant admixture product floated on the top of the water and was removed by mechanical means of scooping it out.

It was observed that: (a) temperature and water type were not factors; (b) agitation time and coagulation were also not major factors; and (c) the coagulant product concentration of 1–15% to oil was adequate, however, the larger percentage would remove 99.9% of the oil and the lower percentage would remove about 99% of the oil. The findings indicate that coagulant concentrations of 5% to oil concentration generates oil removal of better than 99%. Concentration of 10–15% of coagulant to oil generates oil removal better than 99.9% with only a faint trace of oil remaining on the water surface.

The products of Examples 3–12 also were homogenous compositions which did not separate into two-part mixtures upon cooling. These products, as well as those of Examples 1 and 2, had a consistency ranging from thick liquid to semi-solid to solid upon cooling. The semi-solid and solid products ranged from hard thermoplastic resin-like to soft elastic adhesive-like. These products were tested by the following method. 20 g of "spilled" oil was added to a vessel containing 100 g of water. Coagulant was added in concentrations ranging from 1–10% w/w of oil. Coagulated oil was removed by mechanical means and by using a separatory funnel. The remaining water was weighed and percent gain calculated. The oils tested were #6 fuel oil; crude oil; crude bottoms; Lago Treco crude; Pilon crude; and 10W40 motor oil. The results are summarized in Table 1.

TABLE 1

| | % Oil Remaining | | | | |
|---|---|---|---|---|---|
| Ex. # | Pilon Crude | Lago Treco | #6 | Bunker Crude | 10W40 Motor Oil |
| 3 | <1% | <1% | <1% | <1% | <1% |
| 4 | <1% | <1% | <1% | <1% | <1% |
| 5 | <1% | <1% | <1% | <1% | <1% |
| 6 | <1% | <1% | <1% | <1% | <1% |
| 7 | not tested | | | | |
| 8 | <1% | <1% | <1% | <1% | <1% |
| 9 | <0.5% | <0.5% | <0.5% | <0.5% | <0.5% |
| 10 | not tested | | | | |

TABLE 1-continued

| | % Oil Remaining | | | | |
|---|---|---|---|---|---|
| Ex. # | Pilon Crude | Lago Treco | #6 | Bunker Crude | 10W40 Motor Oil |
| 11 | <1% | <1% | <1% | <1% | <1% |
| 12 | <1% | <1% | <1% | <1% | <1% |

The results indicate that the coagulants were effective with all oils tested. The addition of the coagulant to the "spilled" oil quickly caused coagulated masses, which floated on the surface of the water and were easily removed as gummy masses that were attached to the impeller mixing blade, or were easily scoopable so that the coagulated oil was removed with a flat blade or spoon.

The products of Examples 3–20 were homogenous compositions which did not separate into two part mixtures upon cooling. The products were tested as coagulants following the same procedure used for Examples 3–12. These products functioned very effectively as coagulants.

Test Results of Substrates Impregnated with Oil Coagulant Compositions

The impregnated substrates' ability to coagulate oil was tested in the procedure described above for Examples 3–12. The results are summarized in Table 2.

TABLE 2

| | | % Oil Remaining | | | | |
|---|---|---|---|---|---|---|
| Glyceride/ Polymer/Solvent Composition | Substrate | Pilon Crude | Lego Treco | #6 | Bunker Crude | 10W40 Motor Oil |
| 2 | vermiculite | <0.5% | <0.5% | <0.5% | <0.5% | 0.5% |
| | paper | <0.5% | <0.5% | <0.5% | <0.5% | <0.5% |
| | wood chips | <0.5% | <0.5% | <0.5% | <0.5% | <0.5% |
| | STYROFOAM ® | <0.5% | <0.5% | <0.5% | <0.5% | <0.5% |
| 3 | vermiculite | <1% | <1% | <1% | <1% | <1% |
| | paper | <1% | <1% | <1% | <1% | <1% |
| | wood chips | <1% | <1% | <1% | <1% | <1% |
| | STYROFOAM ® | <1% | <1% | <1% | <1% | <1% |
| 4 | vermiculite | <0.5% | <0.5% | <0.5% | <0.5% | <0.5% |
| | paper | <0.5% | <0.5% | <0.5% | <0.5% | <0.5% |
| | wood chips | <0.5% | <0.5% | <0.5% | <0.5% | <0.5% |
| | STYROFOAM ® | <0.5% | <0.5% | <0.5% | <0.5% | <0.5% |
| 5 | vermiculite | <0.5% | <0.5% | <0.5% | <0.5% | <0.5% |
| | paper | <0.5% | <0.5% | <0.5% | <0.5% | <0.5% |
| | wood chips | <0.5% | <0.5% | <0.5% | <0.5% | <0.5% |
| | STYROFOAM ® | <0.5% | <0.5% | <0.5% | <0.5% | <0.5% |
| 6 | vermiculite | <1% | <1% | <1% | <1% | <1% |
| | paper | <1% | <1% | <1% | <1% | <1% |
| | wood chips | <1% | <1% | <1% | <1% | <1% |
| | STYROFOAM ® | <1% | <1% | <1% | <1% | <1% |
| 7 | vermiculite | <1% | <1% | <1% | <1% | <1% |
| | paper | <1% | <1% | <1% | <1% | <1% |
| | wood chips | <1% | <1% | <1% | <1% | <1% |
| | STYROFOAM ® | <1% | <1% | <1% | <1% | <1% |
| 8 | vermiculite | <1% | <1% | <1% | <1% | <1% |
| | paper | <1% | <1% | <1% | <1% | <1% |
| | wood chips | <1% | <1% | <1% | <1% | <1% |
| | STYROFOAM ® | <1% | <1% | <1% | <1% | <1% |
| 9 | vermiculite | <0.5% | <0.5% | <0.5% | <0.5% | <0.5% |
| | paper | <0.5% | <0.5% | <0.5% | <0.5% | <0.5% |
| | wood chips | <0.5% | <0.5% | <0.5% | <0.5% | <0.5% |
| | STYROFOAM ® | <0.5% | <0.5% | <0.5% | <0.5% | <0.5% |
| 10 | vermiculite | <1% | <1% | <1% | <1% | <1% |
| | paper | <1% | <1% | <1% | <1% | <1% |
| | wood chips | <1% | <1% | <1% | <1% | <1% |
| | STYROFOAM ® | <1% | <1% | <1% | <1% | <1% |

TABLE 2-continued

| Glyceride/Polymer/Solvent Composition | Substrate | Pilon Crude | Lego Treco | #6 | Bunker Crude | 10W40 Motor Oil |
|---|---|---|---|---|---|---|
| 11 | vermiculite | <1% | <1% | <1% | <1% | <1% |
|  | paper | <1% | <1% | <1% | <1% | <1% |
|  | wood chips | <1% | <1% | <1% | <1% | <1% |
|  | STYROFOAM ® | <1% | <1% | <1% | <1% | <1% |
| 12 | vermiculite | <1% | <1% | <1% | <1% | <1% |
|  | paper | <1% | <1% | <1% | <1% | <1% |
|  | wood chips | <1% | <1% | <1% | <1% | <1% |
|  | STYROFOAM ® | <1% | <1% | <1% | <1% | <1% |

In all cases, the coagulated mass floated on top of the water and the amount of residual oil after scooping was less than 1%. The substrate impregnated product needed no agitation.

Examples 24–30 initially were not tested as coagulants because they did not form homogenous products, but rather separated into two parts upon cooling off. Apparently, the thermal reaction does not occur between these specific glyceride and polymer combinations at the temperatures used for the other examples. However, when the combinations of these examples were reacted at temperatures ranging from about 500 to 700° F. homogenous products did result which functioned as coagulants.

The above Examples 2–12 glyceride/polymer compositions were also diluted 50:50 with the following solvents: propylene glycol monomethyl ether, available under the trade name DOWANOL PM; 2,2,4-trimethyl-1,3-pentanediol monoisobutyrate, available under the trade names TEXONOL and FLIMER IBT; isopropyl alcohol; and mineral spirits or aliphatic hydrocarbons, available under the trade name SHELSOL 340. The coagulants prepared with these solvents also removed >99% of "spilled" oil. Acetone is a preferred solvent to use for compositions that are used to impregnate surfaces.

Example 32
Chemical Analysis of the Oil Coagulant Compositions

The mechanism of the thermal reaction remains to be elucidated. While not wishing to be bound by any theory in this regard the reaction appears to be a polymerization or phase transition reaction brought about by heat and which is stable at lower temperatures. It is hypothesized that the elevated temperatures create monomer free radicals of the polymers and copolymers which then crosslink with the unsaturated glyceride molecules. It is also hypothesized that perhaps a phase transition is occurring between the oil component and the polymer component. In an effort to determine what type of interaction or reaction is occurring between the oil component and the polymer component, thermal analysis of several of the Example products was conducted. The results indicate that a reaction is occurring between the oil component and the polymer.

Differential scanning calorimetry (DSC) was performed on the reactions of Examples 9 and 10. DSC is a thermal analysis technique that measure the quantity of energy absorbed or evolved by a sample in calories as its temperature is changed. The sample and a reference material are heated at a programmed rate. At a transition point in the sample's heating, such as when it reaches a melting point, the sample requires more or less energy than the reference to heat. These points are indicated the typical DSC readout.

Figure 1B:
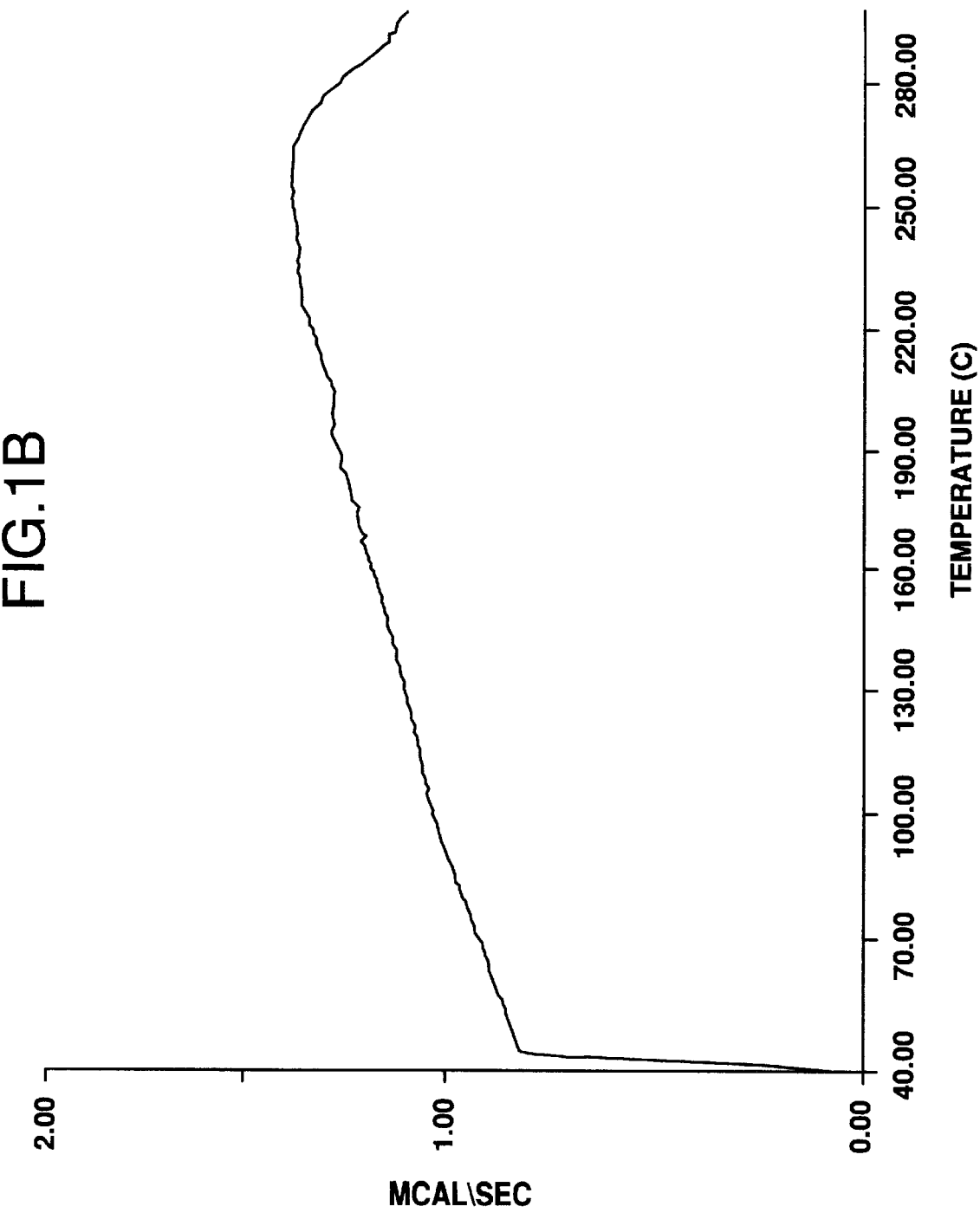
FIG. 1B is a DSC profile of the product of Example 9.

Samples were taken at the beginning of the reaction procedure described earlier and at the end of the reaction. As shown in FIG. 1A, the DSC profile for the initial starting materials of Example 9 is dramatically different from the profile of the product (FIG. 1B). The initial profile shows two exothermic events when the DSC analysis is carried out from 40–280° C., one event occurring at about 100° C. and the other at about 217° C. In the DSC profile of the reaction product, however, there is only one exothermic event, occurring at about 261 ° C. The samples were taken at initial and final points during the reaction and allowed to cool to room temperature before being subjected to the DSC.

Figure 1C:
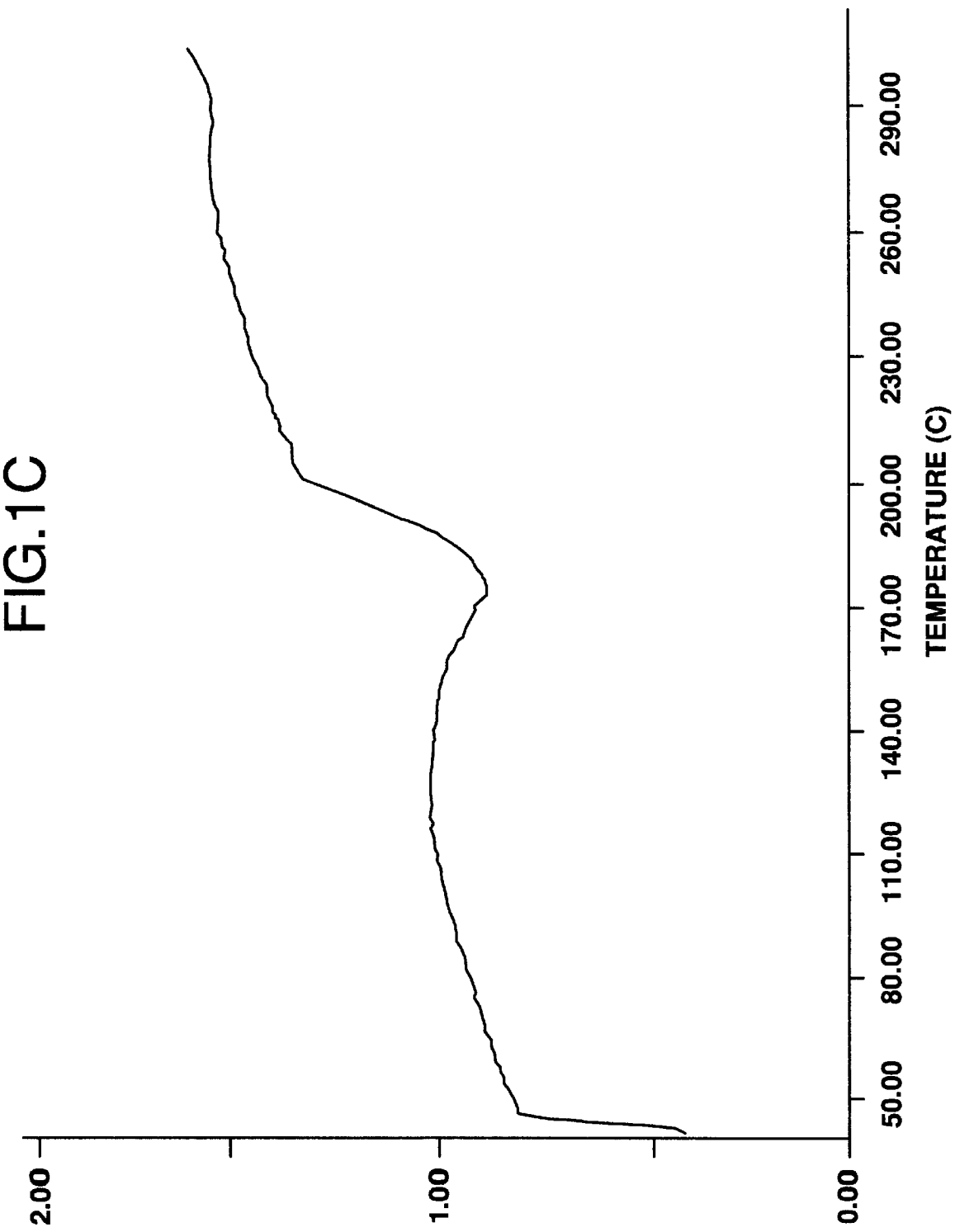
FIG. 1C is a DSC profile of the starting materials of Example 10.
Figure 1D:
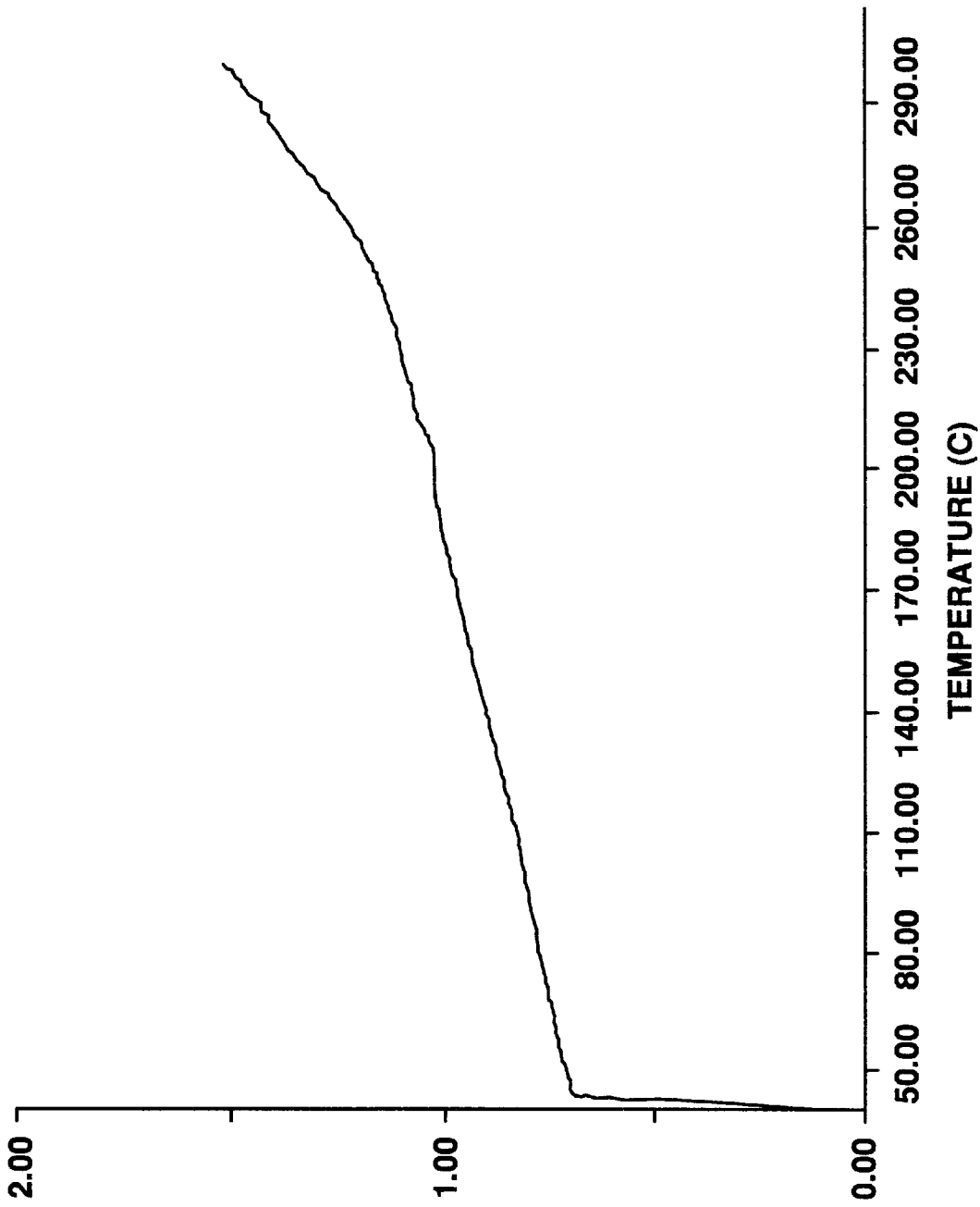
FIG. 1D is a DSC profile of the product of Example 10.
Figure 2A:
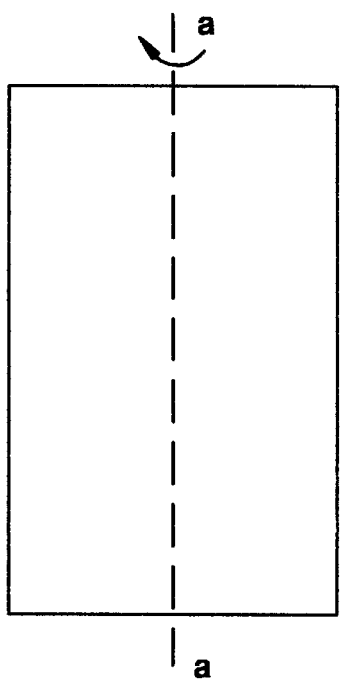
FIGS. 2(a)–2(g) show views of one embodiment of a typical configuration of a mat or pad of the present invention, optionally impregnated with the coagulant composition of the instant invention, for use in the cleanup procedures of oil spills.
Figure 2B:
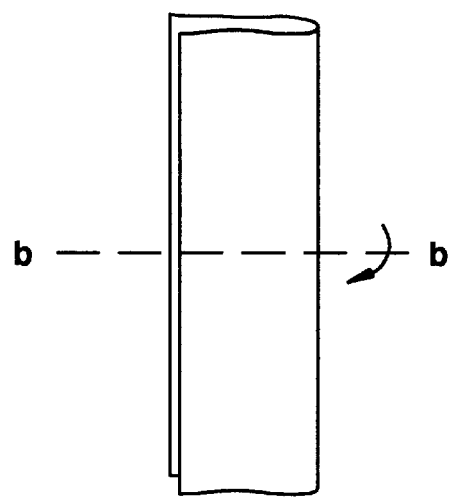
Figure 2C:
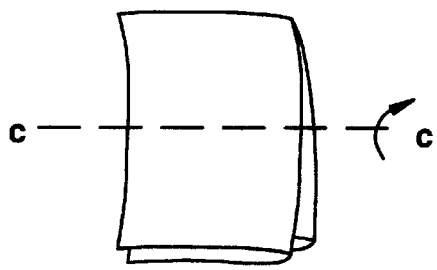
Figure 2D:
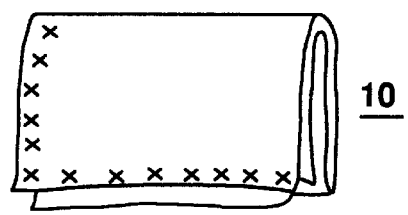
Figure 2E:
Figure 2F:
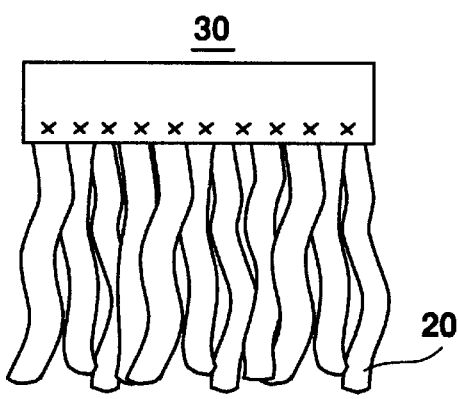
Figure 2G:
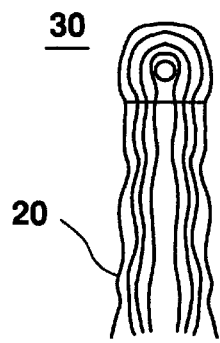

FIGS. 1C and 1D illustrate DSC's of the starting materials and final product of Example 10. Again, the DSC curves generated show that two thermal events occurred for the "just mixed" reactants while only one thermal event occurred for the final product. Thus, the DSCs indicate that the occurrence of a reaction or phase transformation.

Example 33 oil component: 5 g linolenic Acid [$CH_3(CH_2CH\!\!=\!\!CH)_3(CH_2)_7COOH$] BP=230° C., sg=0.914 polymer component: 3 g Elvacite® 2045 poly(isobutylmethacrylate)

Reaction Conditions: Tmax=550° F. $T_R$=~350° F.

Reaction Visible at =350° F. as evidenced by color change to bright yellow and instant cessation of bubbling. Formed Bright Clear Yellow Homogeneous Product Similar to Example 1.

Very Fast Reaction Rate

Functional Test with tissue paper (T.P.) infused w/sample composition

Sigma=0.25=amount of composition/amount of composition+substrate

Example 34 oil component: 5 g trans-7-tetradecene $CH_3(CH_2)_5CH\!\!=\!\!CH(CH_2)_5CH_3$

BP=250° C. Sigma=0.25

Tmax=500° F. $T_R$=~350° F.

polymer component: 3 g Elvacite® 2045 poly(isobutylmethacrylate)

Upon mixing, a white opaque product is formed at 500° F. after 10 minutes reaction time. When tested for coagulation of oil, it was found to form a very tight buoyant ball with #6 oil.

Example 35 oil component: 5 g cis-5-dodecanoic Acid $C_3(CH_2)_5CH=CH(CH_2)_3COOH$

BP=135° C. sg=0.906 polymer component: 3 g Elvacite® 2045 poly(isobutylmethacrylate)

Reaction Rate: 10 min @ 500° F.

Bright yellow clear product Sigma=0.30

Note: This material works approximately 10× better on light oil than any other oil coagulant composition tested.

Example 36 oil component: 5 g oleic acid $CH_3(CH_2)_7CH=CH(CH_2)_7COOH$ polymer component: 3 g Elvacite® 2045 poly(isobutylmethacrylate)

Reaction Rate: 15 minutes @ 500° F. Sigma=0.45

Opaque white product. Moderately effective as oil coagulant.

Example 37 oil component: 5 g erucic acid $CH_3(CH_2)_7CH=CH(CH_2)_{11}COOH$ polymer component: 3 g Elvacite 2045 poly(isobutylmethacrylate)

Reaction Rate: Slow—600° F. for 1 hour Sigma=0.5

Dark yellow crystalline-looking product. Low to moderate effectiveness as oil coagulant.

Example 38 oil component: 5 g 10-Undecynoic Acid $HC=C(CH_2)_8COOH$ polymer component: 3 g Elvacite® 2045 poly(isobutylmethacrylate)

Instant Reaction @~375° F. Sigma=0.40

Dark Black rubbery product

Weak to mediocre performance.

Example 39 oil component: 5 g decyne $CH_3(CH_2)_7C\equiv CH$ polymer component: 3 g Elvacite® 2045 poly(isobutylmethacrylate)

Reaction Rate: Slow—1 hour @ 550° F.

Excellent with #6 oil. Forms very tight buoyant ball.

Example 40 oil component: 5 g stearic acid $CH_3(CH_2)_{16}COOH$ polymer component: 3 g Elvacite® 2045 poly(isobutylmethacrylate)

White opaque reaction product after 1 hour of reaction at 550° F.

Contrary to expectations, this material enhances performance of tissue paper somewhat although the coagulate is loose.

Material is not viscoelastic.

Reaction is believed to take place at the carboxy group.

Example 41 oil component: 5 g eicosane $CH_3(CH_2)_{18}CH_3$ polymer component: 3 g Elvacite® 2045 poly(isobutylmethacrylate)

Same reaction conditions as were used in Example 40, except no reaction takes place.

Solubility product separates in acetone.

Example 42 oil component: 5 g oleic Acid $CH_3(CH_2)_7CH=CH(CH_2)_7COOH$ polymer component: 3 g Elvacite® 2045 poly(isobutylmethacrylate)

Reaction Rate: 1 hour @ 500° F.

Initial reaction @ 350–375° F. Sigma=0.50

Performance mediocre.

Example 43

Fatty Acid/Alkene/Alkyne Polymer Compositions

Example# 33 34 35 36 37 38 39 40 42
Sigma  0.25 0.25 0.3 0.45 0.5 0.4 0.35 0.5 0.5
6 Oil 8 9 10 8 8 8 10 8 7
Furrial 7 8 10 7 5 6.5 8 8 7

The reaction product is infused into tissue paper in a beaker with 10 g samples of oil. 2 g product used for Furrial and 0.5 g used for #6. Performance rated visually from 1–10 based upon residue, buoyancy, water drag-out, coherence (10 at being best at removal). Sigma=σ=grams polymer/grams tissue paper+substrate.

Example 44

Due to higher C—C bond energies of Elvacite® 2008 and Elvacite® 2043 on the polymer backbone, reactions of these polymer components with linseed oil and other drying oils require higher activation energies than with the Elvacite® 2045 polymer. Consequently, reactions previously done where the drying oil was the largest component limited reaction temperatures to the boiling point of the oil component.

This resulted in incomplete, sometimes heterogeneous reaction products. Stoichiometric reactions did not take place resulting in multicomponent product mixtures.

Reactions where the polymer component (w/w) is greater than the oil component (w/w) produce higher temperatures which reach the required activation energy temperature (~600° F.) to produce stoichiometric single component products. Using this relationship, the compositions using Elvacite® 2008 and Elvacite® 2043 were appropriately formulated. Results are as follows.

Ti=Reaction initiation Temperature Tmax=Maximum Temperature

A). 70% Elvacite® 2043/30% linseed oil Ti=325° F. Tmax=655° F.

Hard yellow opaque homogeneous reaction product

B). 70% Elvacite® 2008/30% linseed oil Ti=No Reaction Tmax=655° F.

Resultant binary mixture prepared for test as other parts.

C). 70% Elvacite® 2043/30% sunflower Oil Ti=350° F. Tmax=584° F.

Clear yellow plastic homogeneous reaction product.

D). 70% Elvacite® 2008/30% sunflower oil Ti=350° F. Tmax=659° F.

Homogeneous yellow reaction product.

E). 70% Elvacite® 2043/30% Oleic Acid

Ti=400° F. Tmax=436° F.

Homogeneous opaque soft reaction product.

F). 60% Elvacite® 2043/40% Tung Oil

Ti=400° F. Tmax=542° F.

Hard homogeneous opaque yellow product.

G). 60% Elvacite® 2008/40% Tung Oil

Ti=625° F. Tmax=660° F.

Heterogeneous product. Product separated upon solution in acetone. One phase appeared to be reacted and one phase appeared unreacted. Note: Although separation occurred upon solution in acetone the fact that the product worked at all indicates that at least some of the material was reaction product.

Reaction products A–G were infused into wood chips and tissue paper. Sigma=(wt. polymer/(wt. polymer+wt. substrate)) as calculated. The effectiveness of the coagulant product in coagulating oil was judged subjectively on a scale of 1–10 (10 being the best) based upon coagulation, buoyancy, coherence, residue, water drag-out, and by the amount of material required for effectiveness. Results are as follows:

| TEST | COMPOSITION | OIL | AMT. | σ | RATING |
|---|---|---|---|---|---|
| LST1 TISSUES | 30% LSO 70% 2043 | FO | 2 gm | 0.26 | 6 |
| LST1 TISSUES | 30% LSO 70% 2043 | #6 | 0.5 gm | | 7 |
| LST1 WOODCHIPS | 30% LSO 70% 2043 | FO | 8 gm | 0.15 | 7 |
| LST1 WOODCHIPS | 30% LSO 70% 2043 | #6 | 2 gm | | 7 |
| LST2 TISSUES | 30% LSO 70% 2008 | FO | 1.5 gm | 0.31 | 8 |
| LST2 TISSUES | 30% LSO 70% 2008 | #6 | 0.5 gm | | 8 |
| LST2 WOODCHIPS | 30% LSO 70% 2008 | FO | 1 gm | 0.20 | 7 |
| LST2 WOODCHIPS | 30% LSO 70% 2008 | #6 | 1 gm | | 8 |
| LST3 TISSUES | 30% SFO 70% 2043 | FO | 1.5 gm | 0.27 | 8 |
| LST3 TISSUES | 30% SFO 70% 2043 | #6 | 0.5 gm | | 8 |
| LST3 WOODCHIPS | 30% SFO 70% 2043 | FO | 8 gm | 0.13 | 7 |
| LST3 WOODCHIPS | 30% SFO 70% 2043 | #6 | 1 gm | | 8 |
| LST4 TISSUES | 30% SFO 70% 2008 | FO | 2 gm | 0.30 | 6 |
| LST4 TISSUES | 30% SFO 70% 2008 | #6 | 0.5 gm | | 9 |
| LST4 WOODCHIPS | 30% SFO 70% 2008 | FO | 8 gm | 0.15 | 7 |
| LST4 WOODCHTPS | 30% SFO 70% 2008 | #6 | 1 gm | | 8 |
| LST5 TISSUES | 30% Oleic 70% 2043 | FO | 2 gm | 0.29 | 7 |
| LST5 TISSUES | 30% Oleic 70% 2043 | #6 | 0.5 gm | | 9 |
| LST6 TISSUES | 40% TUNG 60% 2043 | FO | 2 gm | 0.37 | 8 |
| LST6 TISSUES | 40% TUNG 60% 2043 | #6 | 0.5 gm | | 8 |
| LST6 WOODCHIPS | 40% TUNG 60% 2043 | FO | 8 gm | 0.29 | 6 |
| LST6 WOODCHIPS | 40% TUNG 60% 2043 | #6 | 2 gm | | 8 |
| LST7 TISSUES | 40% TUNG 60% 2008 | FO | 2 gm | 0.34 | 7 |
| LST7 TISSUES | 40% TUNG 60% 2008 | #6 | 0.5 gm | | 8 |
| LST7 WOODCHIPS | 40% TUNG 60% 2008 | FO | 8 gm | 0.22 | 5 |
| LST7 WOODCHIPS | 40% TUNG 60% 2008 | #6 | 1 gm | | 8 |

LSO = linseed oil
SFO = sunflower oil
FO = furrial oil (light)
6 = #6 Crude oil (heavy)
2043 = Elvacite methacrylate/methacrylic acid copolymer
2008 = Elvacite methacrylate/methacrylic acid copolymer Example 45

To ascertain the utility of the first and second endpoint products produced by the reactions of the instant invention, certain combinations of oil components and polymer components were reacted, with a sample of the first endpoint product being collected, and the reaction then proceeding to produce the second endpoint product.

oil component: 80 g Sunflower Oil polymer component: 40g isobutylmethacrylate polymer Tmax=546° F. Ti=~500° F.

Both endpoints resulted in uniform single component products.

The solution was heated and first reaction endpoint was observed at ~475° F. The first endpoint @ 475° F. was indicated by a color change, rheology change (material became much more viscous) and the cessation of outgassing (clear pill test). Note: This is a very sharp definite endpoint as indicated by instant cessation of outgassing accompanied by simultaneous solution thickening and color change. A sample was taken at this point. Upon cooling the sample formed the familiar first endpoint (solubility product) material. The material is a soft, rubbery, viscoelastic product similar to that produced in paragraph A of Example 1 above. Oil coagulation test results were in line with previous tests performed on first endpoint products.

The remaining material was heated to a temperature of about 546° F. and this temperature is maintained for 30 minutes. The solution underwent a second color change to dark amber. Upon cooling, the solution remained liquid. The remaining sample of the first endpoint product was mixed with the second endpoint product and the mixture was again heated to 546° F. and this temperature was maintained for 15 minutes. The entire solution became dark amber and upon cooling remained liquid.

Example 46 oil component: 69 g sunflower oil polymer component: 31 g isobutylmethacrylate polymer <500° F.—first endpoint, standard rubbery product >500° F. for 3 hours—Dark amber liquid product The procedure of Example 45 was repeated substantially.

$Ti_1$=350° F. $Ti_2$=530° F. Tmax=593° F.

Example 47 oil component: 28 g Coconut Oil polymer component: 72 g isobutylmethacrylate polymer $Ti_1$=350° F. $Ti_2$=545° F. Tmax=545° F.

First endpoint <500° F.—Standard viscoelastic solid rubbery product

Second endpoint >500° F.—Dark amber liquid material

Example 48 oil component: 72 g Tung Oil polymer component: 28 g isobutylmethacrylate

First endpoint <500° F.—Standard viscoelastic rubbery product, melting point~375° F.

Second endpoint >500° F.—Very hard product formed instantly, melting point~600° F.

Note: This result agrees with our model and is consistent with the high degree of unsaturation of tung oil unlike Examples 45–47.

Example 49

The second endpoint materials synthesized in Examples 45–48 were infused into tissue paper and tested on Furrial and #6 crude oils. Two grams of infused material was added to 10 grams of Furrial crude oil in 100 grams of water and 0.5 grams of infused substrate was added to 10 grams of #6 crude oil in 100 grams of water. The materials were evaluated visually on a scale of 1–10 based on coagulate coherence, water drag-out, residue, and buoyancy. The results are as follows:

| Example # | Sigma | Furrial Crude | #6 Crude |
|---|---|---|---|
| 45 | 0.33 | 7 | 9 |
| 46 | 0.28 | 9 | 9 |
| 47 | 0.23 | 0 | 5 |
| 48 | 0.3 | 8 | 9 |

The above observational data along with the molecular weight data demonstrate that two distinct reactions occur between the oil component and the polymer component and that the extent and occurrence of these reactions are determined by temperature and time.

Example 50

An oil pad 10, as seen in FIGS. 2(*a–g*) useful for the cleanup procedures involving oil spills is produced as follows: Using nonwoven polypropylene material (Available from Fiberweb, Inc.) in a 57 inch width roll, sheets of material are cut to 57"×43" size. After folding in half on the long axis a—a, the sheet is folded in half two more times in the opposite direction along axes b—b and c—c, respectively, forming an eight layer rectangular pad 14.25"× 21.5". The two loose corners or edges are then sealed with a heat sealing apparatus. FIGS. 2(*a*)–2(*g*) show a view of this pad 10. Optionally, the pad may be cut into a plurality of fingers 20 on one end and the other end sealed, as seen in FIGS. 2(*f*) and 2(*g*). A rope or wire may be inserted if a loop is formed at the sealed edge as depicted in FIG. 2(*g*).

In an optional, but preferred embodiment, the pad is coated with a 15% solution of the product of Paragraph A of Example 1 in acetone, and then oven-dried until the acetone solvent has evaporated. When pads are prepared in this manner, a 35 gram pad will absorb 400 grams of oil spilled on a solid surface, or 300 grams of oil spilled in water.

Example 51

A boom 30' useful for the oil containment cleanup procedures involving oil and asphalt spills, and to provide means for keeping spilled asphalt and Group 5 oils afloat is produced as follows:

A bubble pack polyethylene material cut in a 60 inch width×10 foot length is folded into four equal accordion pleats as represented in FIGS. 3(*a–c*). A 10 foot strip 40 of top material of polypropylene is sewed or heat stapled into place along the top edge of the folded material 10'. A polypropylene roping material is then threaded through a hole left under the top material and looped back so as to form hook loops.

In an optional, but preferred embodiment, the pad is coated with an oil coagulant composition, such as a 5% solution of the product of Example 1 in acetone, and then oven-dried until the acetone solvent has evaporated.

After coating, the four layers are sliced so as to provide a plurality of loops or fingers depending from the strip attached to the top material. Preferably, these loops or fingers are adapted to float on the buoyant liquid and contact the oil. Also optionally, attachment means arc placed at the end of each strip so as to enable the coupling of more than one strip to another. A view of this boom is shown in FIGS. 3(*a*)–3(*c*).

When booms are prepared in this manner, a 5 foot section weighing approximately 250–300 grams will absorb 30–100 times its weight of oil spilled on a solid surface, or 10–20 times its weight of oil spilled in water.

Example 52

A product useful for the oil containment cleanup procedures involving oil spills is prepared by impregnating sawdust or STYROFOAM® with a 5% solution of the product of Example 1 in acetone, and then oven-drying until the acetone solvent has evaporated. This affords an inexpensive product which can be easily dispersed over a wide area of an oil spill.

Example 53

The following test was performed using the materials prepared in Examples 50–52 and meltblown polypropylene (MBPP). Two 100 grm samples of oil or asphalt (molten) are poured into a 50 gallon tank. Two (2) grams of materials immediately applied to one of the samples while the other is left untreated as a control. Time to sink and degree of cohesiveness are observed by passing a glass stirring rod through the oil/coagulate. If the entire mass follows the rod and if the entire mass can be lifted from the water's surface using only the stirring rod, this is graded as a ten (10). A grading of five (5) indicates a cohesive mass which can be moved around the water surface using the rod but cannot be lifted out of the water using only the rod. A grading of one (1) indicates no cohesiveness. The results of testing using (a) a boom impregnated with a 5% solution of the product of paragraph 1 of Example 1 (designated as SBB); bl(b) STYROFOAM® chips infused with a 5% solution of the product of paragraph 1 of Example 1 (designated as ST1) and (c) wood chips infused with a 5% solution of the product of paragraph 1 of Example 1 (designated as Wood chips) are as follows:

Index to Chart:

I=floats indefinitely (at least 3 months);

( )=cohesive rating; and

Sx=5=sinks, subscript=number of hours.

| | Asphalt | #6 (Heavy) | Pilon Crude |
|---|---|---|---|
| Wood Chips | NA | I(8) | I(9) |
| STI | I(10) | I(9) | I(10) |

-continued

|  | Asphalt | #6 (Heavy) | Pilon Crude |
|---|---|---|---|
| SBB | I(10) | I(10) | I(10) |
| MBPP | 5(10) | $5_{12}(3)$ | $5_{12}(3)$ |
| Control | 5(10) | $5_{12}(2)$ | $5_{12}(3)$ |

Figure 6:
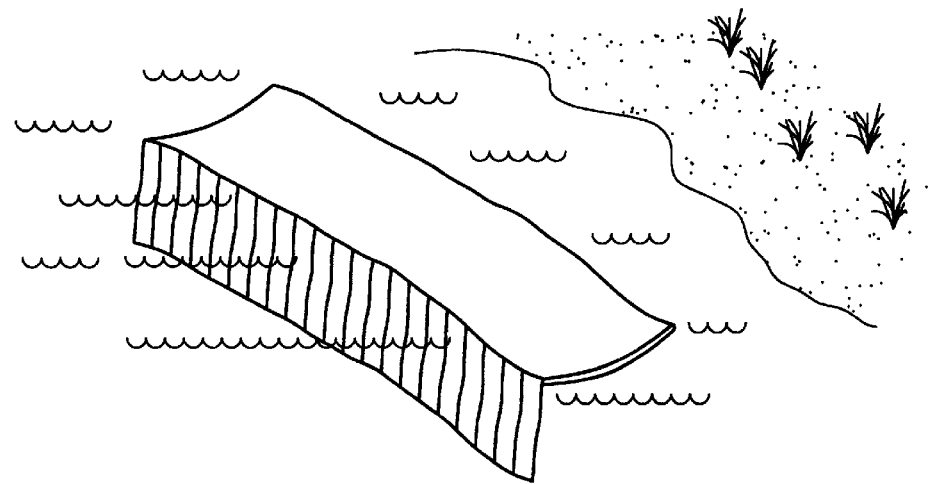
FIGS. 6–8 show various views of a buoyant containment fence according to the present invention.
Figure 7:
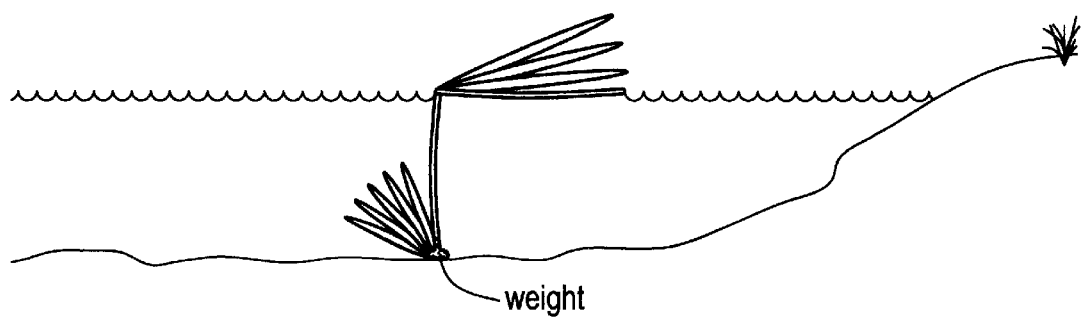
Figure 8:
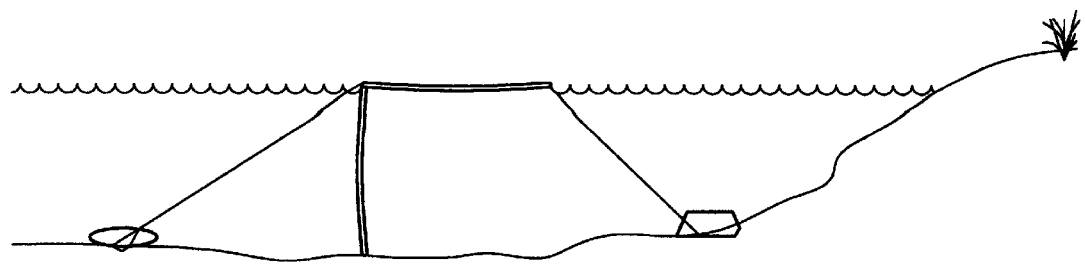

FIGS. 6–8 show particular embodiments of a buoyant containment fence according to the present invention. FIGS. 6–7 show a generally planar floatable portion and a peripheral portion attached thereto. The peripheral portion faces away from the shore line and comprises a plurality of finger members. Preferably the finger members extend into the liquid, such as water, the finger members being relatively less buoyant than the floatable portion. Further preferably, the finger members are flexible. The planar portion may also be flexible. As seen in FIG. 7, the fingers may be capable of extending down to, and contacting, the bottom of the water, while the floatable portion remains near the surface of the water.

As depicted in FIG. 8, the device may further include anchoring means to locate the device in a generally fixed location.

FIGS. 9–11 illustrate various means of weighting the fingers. The distal end of the finger may include a weighted portion or an attached weight. FIG. 10 illustrates one means of weighting a finger in the form of a strip. FIG. 11 illustrates one means of weighting a finger in the form of a loop. The arrows in FIG. 11 illustrate the location where the strip material may be sewn or sealed together so as to lock the weight into position at the distal end of the finger.

FIG. 12 illustrates a buoyant containment fence according to the present invention which includes stiffening means for maintaining the floatable portion in an expanded state. Thus, stiffening rods may be attached to, or incorporated with, the generally planar floatable portion, especially when the floatable portion is made of a flexible material.

As seen in FIG. 13, the device may be disposed in the water without touching bottom. Depending upon the nature and extent of the spill upon the water, such a configuration may be deployed to protect an object or area from encroachment by the spill.

Figure 14:
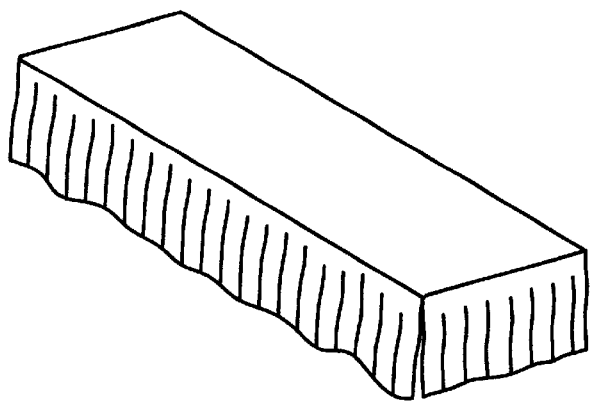
FIG. 14 shows a perspective view of another embodiment of a buoyant containment fence or skimmer according to the present invention, wherein a peripheral portion substantially surrounds and depends from the perimeter of a floatable portion.

FIG. 14 illustrates another embodiment of the present invention which comprises a buoyant containment fence or skimmer having a generally planar floatable portion with a peripheral edge and a peripheral portion attached to the peripheral edge of the floatable portion. The peripheral portion depends from the entire perimeter of the floatable portion. Such device may be used as a fence or boom or skimmer. The device may be further provided with at least one opening in the floatable portion, so that the device may surround an object which extends through the opening.

Figure 15:
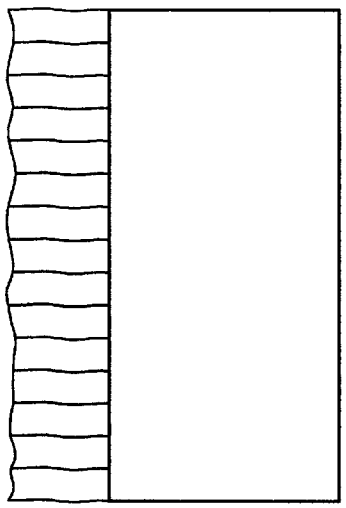
FIGS. 15–17 illustrate an embodiment of a buoyant containment fence or skimmer or boom of the present invention wherein a plurality of fingers are adapted to pivot about a peripheral edge of a floatable portion.
Figure 16:
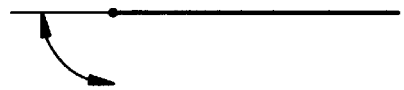
Figure 17:
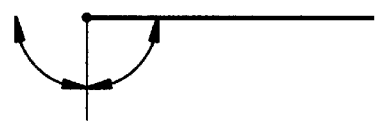

As seen in FIGS. 15–17, the peripheral portion, or the plurality of finger members, may be adapted to pivot about the peripheral edge.

Figure 18:
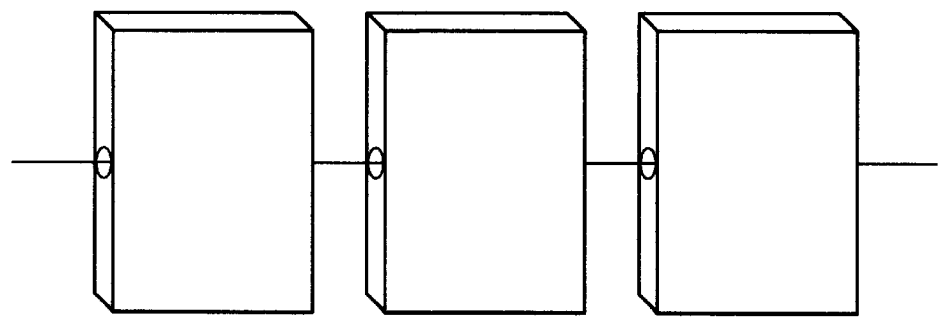
FIG. 18 shows a perspective view of a containment boom of the present invention comprising a plurality of pads, wherein a connecting line connects the pads, and wherein the connecting line passes through each pad at a longitudinal edge.
Figure 19:
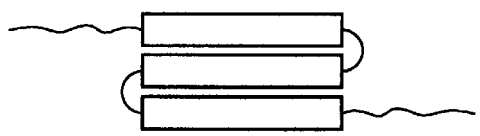
FIG. 19 shows the containment boom of FIG. 18 disposed in a substantially self-stackable relationship.

In another embodiment, the present invention comprises a containment boom which has at least one buoyant pad provided with at least one throughhole and at least one connecting line which passes through the throughhole. As seen in FIG. 18, the connection means includes at least one connecting line which connects the pads. FIG. 19 illustrates the pads in a substantially self-stackable relationship. Thus the device may be conveniently stored or transported in the stacked position and deployed as needed. Preferably the connecting line is flexible in order to facilitate the storage of the device.

Figure 20:
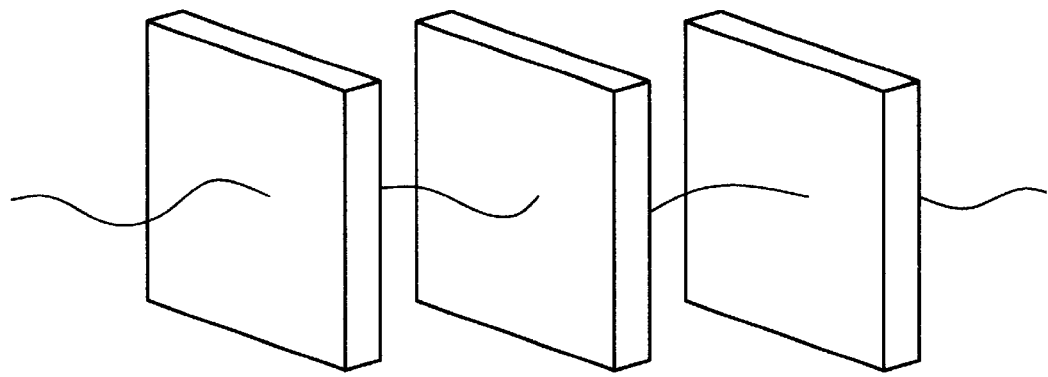
FIG. 20 shows a perspective view of a containment boom of the present invention comprising a plurality of pads, wherein a connecting line connects the pads, and wherein the connecting line is integrally connected with each pad.
Figure 21:
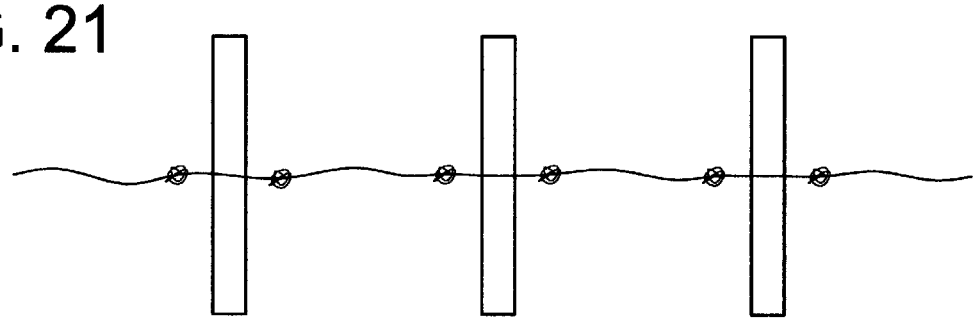
FIG. 21 shows a containment boom of the present invention comprising a plurality of pads, wherein a connecting line connects the pads, and wherein a stop means at least partially prevents movement of the pads with respect to the connecting line.

FIGS. 20–23 illustrate other embodiments of the present invention. FIG. 20 shows a connecting line fixedly or integrally attached to the pads. FIG. 21 shows a connecting means which includes stop means for at least partially preventing at least one of the pads from moving longitudinally. The stop means illustrated in FIG. 21, in particular, includes knots in the connecting line. The stop means may also comprise a clamp, washer, tie, staple, or other suitable stop.

Figure 22:
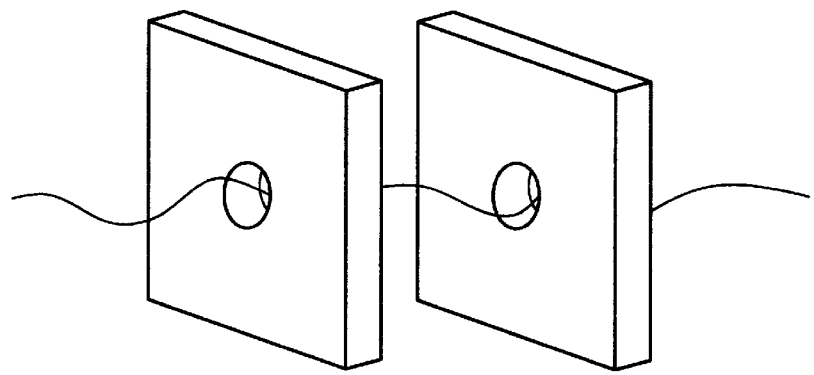
FIG. 22 shows a containment boom of the present invention comprising a plurality of pads, wherein a connecting line connects the pads, and wherein the pads are provided with a through hole to enable slidable mounting on the connecting line.

FIG. 22 shows pads slidably mounted on a connecting line. A first plurality of slidably mounted pads may be separated from one or more other pluralities of pads by one or more stop means which limit the extent of connecting line over which each pad or plurality of pads may slide.

Figure 23:
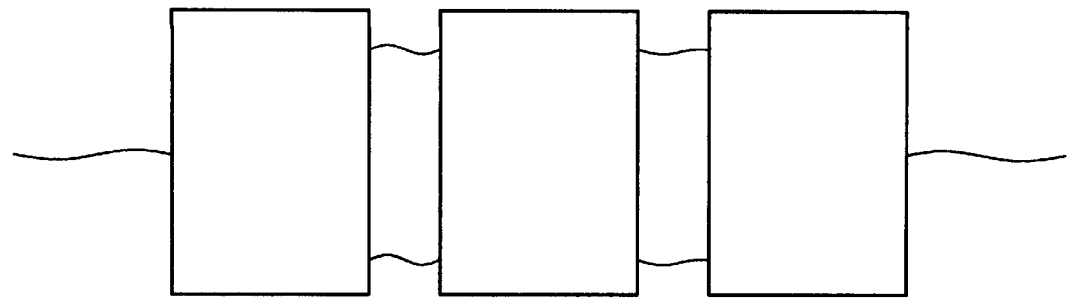
FIG. 23 shows a containment boom of the present invention comprising a plurality of pads, wherein a plurality of connecting lines connects the pads.

FIG. 23 illustrates a connecting means comprised of a plurality of line segments, wherein at least one line segment interconnects adjacent pads.

The stop means may be provided to at least partially prevent at least one of the pads from moving longitudinally.

The connecting line may be made, for example, from wire, cable, rope, or plastic strips. Preferably, the connecting line is flexible, although a substantially rigid connecting line may be preferred in particular situations.

Figure 24:
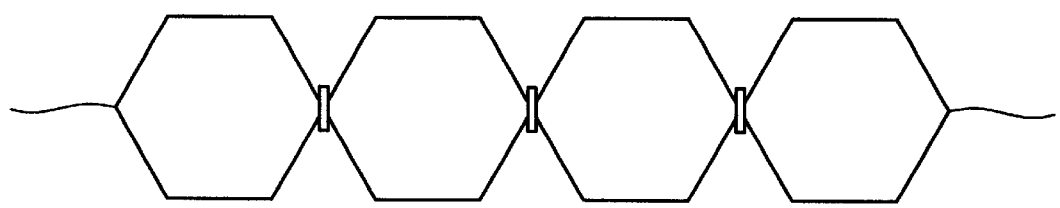
FIG. 24 shows a device according to the present invention comprising a plurality of pads, wherein the pads contact one another.

FIG. 24 illustrates a device according to the present invention having pads which at least partially contact each other. The pads are shown having a hexagonal shape, although other shapes may be used. Furthermore the pads may be connected to one another, for example by a hinge means which allows pivoting movement between adjacent pads.

Figure 25:
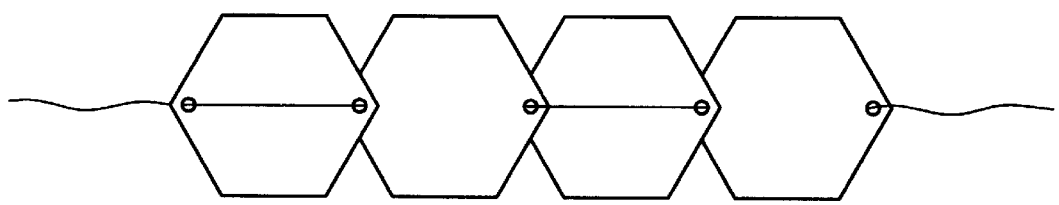
FIG. 25 shows another device according to the present invention comprising a plurality of pads, wherein the pads are capable of overlapping one another.

FIG. 25 illustrates another embodiment of the present invention wherein the pads contact one another, and overlap one another, in a scale-like fashion. The pads are shown having a hexagonal shape, although other shapes may be used. Furthermore each pad shown in FIG. 25 is provided with two throughholes, so that a connecting line may pass through the throughholes in an alternating weave, thereby connecting the adjacent pads and holding them in relationship to one another.

Figure 26:
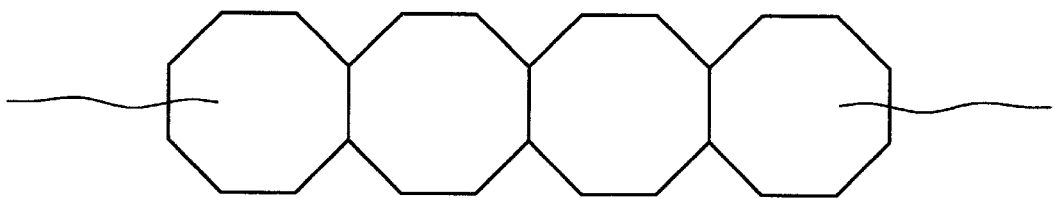
FIG. 26 shows yet another device according to the present invention comprising a plurality of pads integrally connected together at folds about which adjacent pads may pivot.

FIG. 26 illustrates pads integrally connected together at folds about which adjacent pads may move or pivot. The pads may be provided with throughholes and a connecting line, similar to that shown in FIG. 25, or may have end line segments as depicted in FIG. 26.

Figure 27:
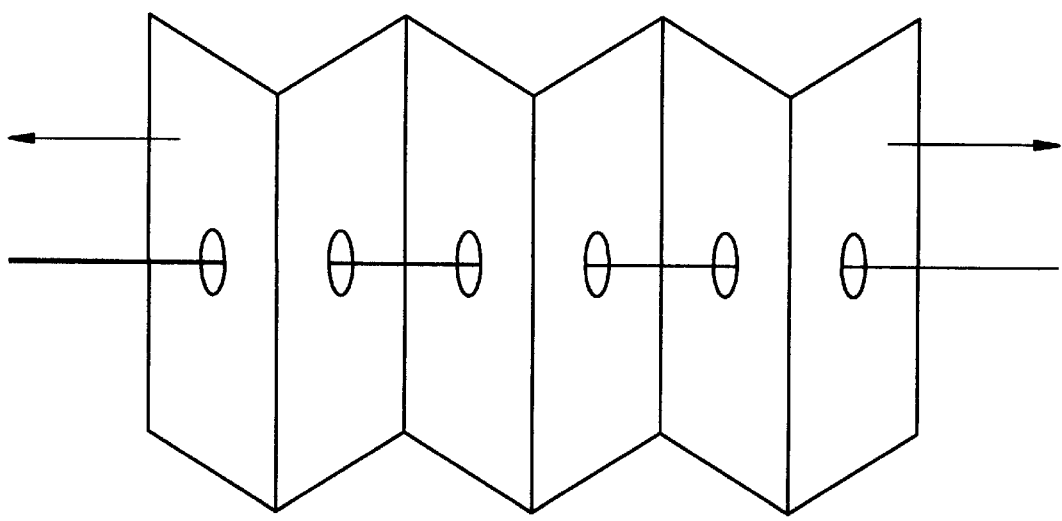
FIG. 27 shows still another device according to the present invention comprising at least one pad having a plurality of accordion-like folds.

FIG. 27 illustrates yet another embodiment of the present invention wherein the device includes a pad having a plurality of accordion-like folds which define a plurality of pad faces. Each pad face is provided with at least one throughhole. A connecting line may pass through the throughholes, and the pad may be spread open by an outwardly directed force, such as that represented by the arrows.

FIGS. 28–29 illustrate another particularly preferred embodiment of the present invention which comprises a device for controlling at least one contaminant which is suspended in a liquid, the device comprising a plurality of floatable, generally planar pads having a pair of opposed faces, an outer periphery, and a carrier means which includes a connecting line which passes through the opposed faces. Preferably the pads include one or more through holes through which the connecting line may pass. The outer periphery has a generally octagonal shape.

As seen in FIGS. 28–29, the pads overlap one another when the device is deployed on the liquid. Preferably, the pads arc disposed in a successive overlapping scale-like relationship when the device is deployed on the liquid in order to provide a substantially continuous contaminant barrier or shield which floats on the surface of the liquid. The pads may be fixedly attached to the connecting lie, or may alternately slide upon one another. This faciliates oil removal in various water/liquid conditions.

Figure 32:
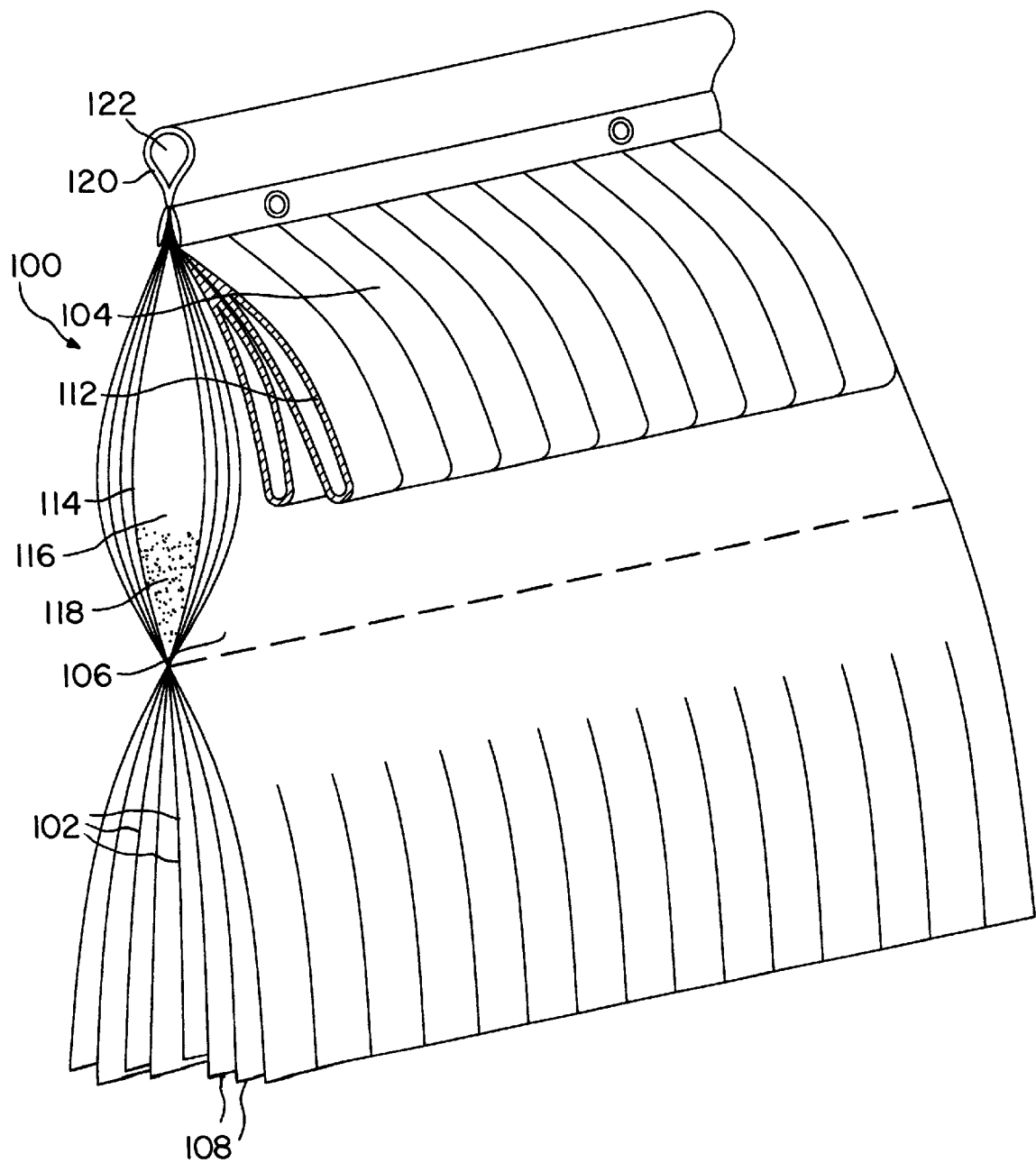
FIG. 32 shows a device according to the present invention, similar to that of FIGS. 30–31, and further provided with a plurality of slits.

FIGS. 30–32 illustrate another embodiment of the present invention comprising a device for controlling the spread of at least one contaminant on or through a supporting liquid. The device 100 comprises a plurality of sheet members 102 and a plurality of loop members 104. Each sheet member 102 has a top edge 106, a bottom edge 108, and a middle portion 110. Each loop member 104 has a closed bottom end 112 and a top end 114. The top edges 106 and ends 114 of the sheet members 102 and the loop members 104 are joined together, thereby defining at least one inner pouch 116. A weight or weight member or weighting material 118 may be disposed in the inner pouch 116. For example, sand may be utilized as a weighting material, especially in areas where sand is plentiful, cheap and easily accessible, as typically found at shorelines or oil spill sites. A top member 120 may be folded over the top edges 106 and/or ends 114 of the sheet members 102 and/or loop members 104, respectively, and fixedly attached thereto, preferably in a fashion to provide a longitudinal passage 122 extending along the top edge of the device 100, and further preferably adapted to accept a buoy line therethrough for supporting or directing the device 100. The connecting line may thus be used to place the device in the liquid in a desired orientation. In a particular embodiment, the sheet members 102 are comprised of non-woven polypropylene, and the loop members 104 are comprised of a buoyant material such as polyethylene or bubble-pack polyethylene.

FIG. 32 shows a particular embodiment of the present invention wherein one or more of the sheet members 102 is provided with a plurality of cuts or slits, thereby forming a plurality of strips or fingers or flaps.

It should be appreciated that the devices which embody the present invention may be used with or without a coagulant or other chemical composition which interacts with the contaminant. The coagulant or chemical composition may at least partially impregnate or may at least partially coat the device or a portion thereof. Furthermore, various embodiments of the present invention may be utilized to control, contain, or confine one or more contaminants, in addition to or instead of oil or asphalt, which are suspended by, or mixed with, or which otherwise invade a supporting liquid. The supporting liquid may be water or some other liquid.

The invention has been described in detail with particular reference to the preferred embodiments. It will be understood that variations and modifications can be effected within the spirit and scope of the invention and the claims appended hereto. For example, while the invention is described as a thermal reaction product it is anticipated that the inventive compositions could be obtained in a different way, such as by free-radical catalysis or the use of photo-sensitive reaction initiators.

What is claimed is:

1. A device for controlling at least one contaminant which is suspended by a liquid, said device comprising:

immobilizing means for contacting said liquid and immobilizing said contaminant, said immobilizing means having at least one immobilizing surface for interacting with said contaminant; said immobilizing surface comprising a porous substrate impregnated with a coagulant composition comprising a homogenous thermal reaction product of an oil component selected from the group consisting of glycerides, fatty acids, alkenes and alkynes and a methacrylate or acrylate polymer component; and carrier means for said immobilizing means for placing said immobilizing surface in contact with said liquid in a desired orientation.

2. The device according to claim 1 wherein said immobilizing means is at least partially buoyant when immersed in said liquid.

3. The device according to claim 1 further comprising weighting means for maintaining at least a part of said immobilizing surface below the surface of said liquid.

4. The device according to claim 1 in combination with at least one weight wherein said immobilizing means further comprises at least one pouch adapted to hold said weight.

5. The device according to claim 1 wherein said device further comprises an anchoring means attached to said carrier means for anchoring said device in said liquid.

6. The device according to claim 1 wherein said immobilizing surface of said immobilizing means is disposable substantially at the surface of said liquid.

7. The device according to claim 6 wherein said surface portion further comprises a floatable portion.

8. The device according to claim 1 wherein said immobilizing surface is provided at a subsurface portion for immobilizing said contaminant which is disposed below the surface of said liquid.

9. The device according to claim 1 wherein said immobilizing surface is provided at a plurality of adjacent sheets.

10. The device according to claim 9 wherein at least one of said plurality of sheets is provided with a plurality of slits extending inwardly from a peripheral edge.

11. The device according to claim 10 wherein said sheets are made from non-woven polypropylene.

12. The device according to claim 1 wherein said immobilizing surface is provided at least one pad.

13. The device according to claim 12 wherein said pad further comprises at least one buoyant pad provided with at least one through hole.

14. The device according to claim 12 wherein said carrier means further comprises at least one connecting line which passes through said through hole.

15. The device according to claim 12 wherein said pad further comprises a plurality of accordion-like folds.

16. The device according to claim 12 wherein said pad further comprises at least one buoyant pad and at least one non-buoyant pad.

17. The device according to claim 16 wherein said buoyant pad is at least partially made from (bubble pack) polyethylene and said non-buoyant pad is at least partially made from non-woven polyethylene.

18. The device according to claim 12 wherein said pad further comprises a plurality of pads disposed in successive longitudinal relationship with respect to said carrier means.

19. The device according to claim 18 wherein said plurality of pads further comprises a plurality of floatable, generally planar pads having a pair of opposed faces and an outer periphery, wherein said carrier means further comprises a connecting line which passes through said opposed faces.

20. The device according to claim 19 wherein said outer periphery has a generally octagonal shape.

21. The device according to claim 19 wherein at least one of said pads overlaps at least one other of said pads when said device is deployed on said liquid.

22. The device according to claim 21 wherein said pads are disposed in a successive overlapping scale-like relationship when said device is deployed on said liquid, thereby providing a substantially continuous contaminant barrier at the surface of said liquid.

23. The device according to claim 18 wherein said pads are fixedly attached to said carrier means.

24. The device according to claim 18 wherein said pads are slidably disposed on said carrier means.

25. The device according to claim 18 wherein each said pad is capable of contacting at least one adjacent said pad, whereby said device serves as an uninterrupted contaminant barrier in said liquid.

26. The device according to claim 25 wherein said device is capable of being stored in a substantially self-stackable arrangement.

27. The device according to claim 12 wherein said pad further comprises a plurality of strips (flexibly) attached to said carrier means.

28. The device according to claim 12 wherein said pad further comprises a plurality of loops attached to said carrier means.

29. The device according to claim 12 wherein said carrier means further comprises a connecting line disposed through said immobilizing means.

30. The device according to claim 1 wherein said carrier means further comprises at least one cylindrical master tube having a longitudinal axis.

31. The device according to claim 30 wherein said master tube is substantially made from the same material as said pad.

32. The device according to claim 30 wherein said carrier means further comprises a connecting line disposed within said master tube.

33. The device according to claim 1 wherein the porous substrate is a floatable material.

34. The device according to claim 33 wherein the porous substrate is polystyrene.

35. The device according to claim 33 wherein the porous substrate is polypropylene.

36. A device for controlling at least one contaminant which is suspended by a liquid, said device comprising:

immobilizing means comprising at least one buoyant pad and at least one non-buoyant pad for contacting said liquid and immobilizing said contaminant, said immobilizing means having at least one immobilizing surface for interacting with said contaminant; and carrier means for said immobilizing means for placing said immobilizing surface in contact with said liquid in a desired orientation.

37. The device according to claim 36 wherein said buoyant pad is at least partially made from (bubble pack) polyethylene and said non-buoyant pad is at least partially made from non-woven polyethylene.

* * * * *